US012465811B2

(12) United States Patent
Hawkins, III et al.

(10) Patent No.: US 12,465,811 B2
(45) Date of Patent: *Nov. 11, 2025

(54) INDOOR BICYCLE TRAINING DEVICE

(71) Applicant: Wahoo Fitness LLC, Atlanta, GA (US)

(72) Inventors: Harold M. Hawkins, III, Atlanta, GA (US); Michael Carlson, Atlanta, GA (US)

(73) Assignee: Wahoo Fitness LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,815

(22) Filed: Feb. 16, 2023

(65) Prior Publication Data

US 2023/0338774 A1  Oct. 26, 2023

Related U.S. Application Data

(63) Continuation of application No. 17/005,246, filed on Aug. 27, 2020, now Pat. No. 11,607,583.
(Continued)

(51) Int. Cl.
A63B 22/06 (2006.01)
A63B 21/00 (2006.01)
(Continued)

(52) U.S. Cl.
CPC .... A63B 22/0605 (2013.01); A63B 21/00069 (2013.01); A63B 21/00076 (2013.01);
(Continued)

(58) Field of Classification Search
CPC . B62M 9/1246; B62M 9/134; A63B 22/0605; A63B 21/4035; A63B 21/0052;
(Continued)

(56) References Cited

U.S. PATENT DOCUMENTS 6,126,577 A    10/2000  Chang
6,253,638 B1 *  7/2001  Bermudez ................ B62M 3/02
                                                       74/594.1
(Continued)

FOREIGN PATENT DOCUMENTS

CN    101918087 A    12/2010
CN    107970567 A     5/2018
(Continued)

Primary Examiner — Andrew M Kobylarz
(74) Attorney, Agent, or Firm — Polsinelli PC; Gregory P. Durbin

(57) ABSTRACT

An indoor, stationary, bicycle training device that provides advantages over conventional designs of exercise bicycles is provided. The stationary bicycle may include a tilting/pivoting mechanism to orient the indoor bicycle to simulate descending or climbing. The indoor bicycle may include flexible and resilient frame elements to support the indoor training device to move side-to-side under some riding situations thereby simulating the side-to-side swaying motion of an outdoor bicycle under the same riding situations. The indoor bicycle may include several combinations of frame adjustments to provide configurable dimensions of the indoor bicycle to adjust the frame to properly fit the rider, which may be adjusted based on corresponding dimensions of a user's outdoor bicycle. Still other aspects of the stationary bicycle device may aid in creating an "outdoor" feeling while using the device.

19 Claims, 29 Drawing Sheets

Related U.S. Application Data

(60) Provisional application No. 62/903,483, filed on Sep. 20, 2019, provisional application No. 62/893,563, filed on Aug. 29, 2019, provisional application No. 62/893,649, filed on Aug. 29, 2019.

(51) Int. Cl.
*A63B 21/005* (2006.01)
*A63B 21/22* (2006.01)
*A63B 22/00* (2006.01)
*A63B 23/04* (2006.01)
*A63B 24/00* (2006.01)
*A63B 71/06* (2006.01)

(52) U.S. Cl.
CPC ........ *A63B 21/005* (2013.01); *A63B 21/0052* (2013.01); *A63B 21/0058* (2013.01); *A63B 21/225* (2013.01); *A63B 21/4035* (2015.10); *A63B 22/0046* (2013.01); *A63B 23/0476* (2013.01); *A63B 24/0062* (2013.01); *A63B 24/0087* (2013.01); *A63B 71/0622* (2013.01); *A63B 2022/0033* (2013.01); *A63B 2022/0617* (2013.01); *A63B 2022/0623* (2013.01); *A63B 2022/0641* (2013.01); *A63B 2024/009* (2013.01); *A63B 2024/0093* (2013.01); *A63B 2024/0096* (2013.01); *A63B 2071/0638* (2013.01); *A63B 2071/0644* (2013.01); *A63B 2071/0677* (2013.01); *A63B 2209/08* (2013.01); *A63B 2220/05* (2013.01); *A63B 2220/10* (2013.01); *A63B 2220/18* (2013.01); *A63B 2220/30* (2013.01); *A63B 2220/40* (2013.01); *A63B 2220/64* (2013.01); *A63B 2220/80* (2013.01); *A63B 2220/803* (2013.01); *A63B 2220/807* (2013.01); *A63B 2220/833* (2013.01); *A63B 2225/09* (2013.01); *A63B 2225/093* (2013.01); *A63B 2225/096* (2013.01)

(58) Field of Classification Search
CPC ............ A63B 21/0058; A63B 24/0062; A63B 71/0622; A63B 21/00069; A63B 21/00076; A63B 21/005; A63B 21/225; A63B 22/0046; A63B 24/0087; A63B 23/0476; A63B 2071/0677; A63B 2220/05; A63B 2220/807; A63B 2225/096; A63B 2071/0638; A63B 2022/0623; A63B 2225/09; A63B 2024/0093; A63B 2225/093; A63B 2022/0617; A63B 2022/0033; A63B 2022/0641; A63B 2220/64; A63B 2220/80; A63B 2220/833; A63B 2220/18; A63B 2220/30; A63B 2024/009; A63B 2220/10; A63B 2225/20; A63B 2220/803; A63B 2024/0096; A63B 2071/0644; A63B 2220/40; A63B 2209/08
See application file for complete search history.

(56) References Cited

U.S. PATENT DOCUMENTS

| | | | | |
|---|---|---|---|---|
| 8,834,323 | B2* | 9/2014 | Chen | .................. A63B 22/0605 |
| | | | | 482/57 |
| 9,381,395 | B2 | 7/2016 | Pinzon | |
| 9,987,514 | B1* | 6/2018 | Tung | .................. A63B 22/0605 |
| 10,071,286 | B1 | 9/2018 | Gajewski | |
| 10,561,877 | B2* | 2/2020 | Workman | .......... A63B 22/0046 |
| 10,702,736 | B2 | 7/2020 | Weston et al. | |
| 11,033,775 | B2* | 6/2021 | Chen | ...................... A63B 22/16 |
| 11,607,583 | B2* | 3/2023 | Hawkins, III | ..... A63B 21/0058 |
| 2002/0055422 | A1* | 5/2002 | Airmet | ................... A63B 22/16 |
| | | | | 482/61 |
| 2007/0099767 | A1 | 5/2007 | Harashima | |
| 2007/0298935 | A1 | 12/2007 | Badarneh et al. | |
| 2009/0170667 | A1 | 7/2009 | Irving et al. | |
| 2010/0288901 | A1 | 11/2010 | Wallach | |
| 2011/0172059 | A1* | 7/2011 | Watterson | .......... A63B 24/0062 |
| | | | | 482/5 |
| 2012/0071301 | A1* | 3/2012 | Kaylor | ............. A63B 21/00058 |
| | | | | 482/57 |
| 2012/0302403 | A1 | 11/2012 | Touret | |
| 2014/0087923 | A1* | 3/2014 | Warren | ................. A63B 26/003 |
| | | | | 482/57 |
| 2014/0148312 | A1 | 5/2014 | Lo | |
| 2014/0274564 | A1 | 9/2014 | Greenbaum | |
| 2015/0111704 | A1* | 4/2015 | Lin | .................... A63B 22/0605 |
| | | | | 482/57 |
| 2016/0287931 | A1* | 10/2016 | Tung | ...................... A63B 22/16 |
| 2016/0325146 | A1* | 11/2016 | Shin | ...................... H04L 67/306 |
| 2017/0136293 | A1* | 5/2017 | Caccia | ................. A63B 21/225 |
| 2018/0071569 | A1* | 3/2018 | Gomberg | ............ A63B 21/015 |
| 2018/0117383 | A1* | 5/2018 | Workman | .......... A63B 22/0605 |
| 2018/0200566 | A1* | 7/2018 | Weston | ............. A63B 71/0622 |
| 2018/0207485 | A1 | 7/2018 | Sun et al. | |
| 2019/0178313 | A1 | 6/2019 | Wrobel | |
| 2020/0054919 | A1 | 2/2020 | Karabush | |
| 2021/0077856 | A1 | 3/2021 | Hawkins et al. | |
| 2021/0197015 | A1* | 7/2021 | Anderson | ............ A63B 21/012 |

FOREIGN PATENT DOCUMENTS

| | | |
|---|---|---|
| DE | 202012104674 U1 | 1/2013 |
| EP | 2949367 A1 | 12/2015 |
| JP | 2013-508045 A | 3/2013 |
| TW | M512421 U | 11/2015 |
| TW | M551941 U | 11/2017 |
| TW | M562142 U | 6/2018 |
| WO | 2013131154 A1 | 12/2013 |
| WO | 2014016781 A1 | 1/2014 |

* cited by examiner

INDOOR BICYCLE TRAINING DEVICE

CROSS-REFERENCE TO RELATED APPLICATIONS

The present patent application is a continuation of U.S. Nonprovisional patent application Ser. No. 17/005,246 filed Aug. 27, 2020 entitled "Indoor Training Bicycle Device", which claims priority under 35 U.S.C. § 119 to U.S. Provisional Patent Application No. 62/893,563 filed Aug. 29, 2019 entitled "Bicycle Training Device", to U.S. Provisional Patent Application No. 62/893,649 filed Aug. 29, 2019 entitled "Stationary Bicycle Adjustment Method and System", and to U.S. Provisional Patent Application No. 62/903,483 filed Sep. 20, 2019 entitled "Stationary Bicycle Adjustment Method and System", all of which are both hereby incorporated by reference herein.

TECHNICAL FIELD

Embodiments of the present disclosure generally relate to an indoor cycling training device, and related systems, and more specifically for an indoor bicycle device providing various features including portability, frame adjustability and rider fit customizability, integrated climbing ascending and descending and control, and pedaling resistance controllability, among other features and advantages that individually and collectively in various combinations provide a dynamic platform for providing a dynamic indoor training environment including simulating and emulating outdoor riding, and interacting with various virtual training environments among other advantages.

BACKGROUND

Indoor cycling training, with the right equipment, can be very enjoyable. Additionally, busy schedules, bad weather, focused training, and other factors inspire bicycle riders, ranging from the novice to the professional, to train indoors. Numerous indoor training options exist, including numerous different types of exercise bicycles that have been developed over the years. A typical exercise bicycle may look similar to an actual bicycle including a seat, handlebars, pedals, crank arms, a drive sprocket and chain but often without wheels. Exercise bikes typically include some form of adjustable resistance against pedaling and for the rider to alter the amount of power needed to pedal the exercise bicycle.

While useful for training indoors, conventional exercise bicycles offer an experience that is often uncomfortable, dissimilar from actually riding a bicycle outdoors, and otherwise suffering from various insufficiencies. For example, many conventional exercise bicycles include a heavy rigid frame, which can be excellent for exercising but is not meant to have the same feel as riding outdoors. While exercise bicycles provide many options for changing dimensions, they are often unable to be adjusted in sufficient dimensions to replicate all of the dimensional relationships between frame members and handlebars, seat, etc., found in a well fit outdoor bicycle. These issues, among others, contribute to the different feelings between riding an exercise bicycle and a conventional outdoor bicycle that includes wheels and is intended to propel the rider forward when the drive crank is engaged or operated by the rider. The rigid frame of typical stationary training bicycles and so-called "spin" (indoor cycling) bicycles may also fail to simulate the feeling of side-to-side motion experienced when pedaling hard, standing to pedal during a hard sprint or climb, and that a rider may experience when riding a bicycle outdoors. The size and control of crank assemblies, gear ratios, shifters, and other aspects of stationary training bicycle devices may also vary in comparison to outdoor bicycles to further provide a "stationary" experience different than outdoor riding.

Computer integrated virtual riding and training software, such as TrainerRoad™ and Zwift™ among many others, are also becoming more prevalent. As many riders participate in riding a bicycle due to the enjoyment of the activity when riding outdoors, an indoor training device that integrates well with virtual riding systems, and provides the dynamic experiences of riding outdoors would be beneficial. With these thoughts in mind among others, various aspects of a stationary bicycle training device as disclosed herein were conceived.

SUMMARY

One aspect of the present disclosure relates to a stationary bicycle device comprising a frame. The frame may include a post pivotally coupled with a foot assembly positioned to engage a surface, a top tube extending forwardly from the post, in one example from the post at an end opposite the foot assembly, a flexible support leg structure supporting the post, the flexible support leg structure comprising a first flexibly resilient leg and a second flexibly resilient leg, the first flexibly resilient leg deforming to allow the post to lean to one side in response to a first force and the second flexibly resilient leg deforming to allow the post to lean to another side in response to a second force, and a tilting mechanism operably coupled with the post, the tilting mechanism controllably pivoting the post forwardly or rearwardly to simulate a decline or incline riding position.

Another aspect involves an indoor cycle comprising a frame with a pivotal vertically orientated post supporting a seat and a handlebar, and a tilting mechanism operably coupled with the pivotal vertically oriented post, the tilting mechanism to pivot the post forwardly to orient the frame to simulate a descending riding position or pivot the post rearwardly to orient the frame to simulate a climbing riding position.

Another aspect of the present disclosure relates to a stationary indoor training device comprising a post comprising an upper end area and a lower end area, the post extending vertically from a foot (or a base) that engages a surface, a top tube extending forwardly from the upper end area of the post. The top tube, in one example, supports an adjustable seat assembly and the post substantially supports a weight of a user upon a seat of the adjustable seat assembly. The indoor training device further includes a first flexible support arm and a second flexible support arm each extending substantially forwardly and rearwardly from the foot or the base, each flexible support arm displacing or otherwise configured to vertically displace in response to a shifting of the weight of the user in a lateral motion and causing or otherwise allowing the post to lean in a direction of the shifting of the weight of the user.

Yet another aspect of the present disclosure relates to an adjustable indoor stationary bicycle device comprising an adjustable length center post comprising a lower end and an upper end and a top tube extending forwardly from the upper end of the center post, the top tube comprising a forward end and a rearward end. The stationary bicycle device may also include a seat assembly adjustably coupled with the rearward end of the top tube to extend forwardly or rearwardly relative to the rear end of the top tube, the seat assembly supporting a seat and a handlebar assembly adjustably coupled with the forward end of the top tube to extend forwardly or rearwardly relative to the forward end of the top tube, the handlebar assembly supporting a handlebar.

Still another aspect of the present disclosure relates to an exercise bicycle with a frame that rocks from side to side. The frame may include a first flexible resilient member and a second flexible resilient member supporting an exercise bicycle on a surface. The flexible resilient members each include at least two points engaging the surface, and a portion between the two points disposed above the surface. The first flexible resilient member supporting a first side of the exercise bicycle. In an example, the first flexible resilient member may define an arcuate shape. The second flexible resilient member may also define an arcuate shape. Regardless, the second flexible resilient member includes at least two points engaging the surface, and a second portion between the two points disposed above the surface, the second flexible resilient member supporting a second side of the exercise bicycle. The first flexible resilient member and the second flexible resilient member may support the frame in a neutral vertical orientation normally, the portion of the first flexible resilient member deflecting downwardly toward the surface in response to a user shifting weight to the first side, the portion of the second flexible resilient member deflecting downwardly toward the surface in response to the user shifting weight to the second side.

Yet another aspect of the present disclosure relates to a method of supporting an exercise device. With a first flexible resilient member, to one side (e.g., the left side with reference to some portion of the device along a vertical center plane defined by the handlebar stem, seat post and top tube therebetween) engaging a surface to provide forward support, rearward support and lateral support given it is oriented to the side, for an exercise device. The flexible resilient member includes a portion disposed above the surface and the first flexible resilient member displaces in a first direction in response to a first force applied to the first flexible resilient member, the first force corresponding to a first lateral movement of a user of the exercise device. For example, during pedaling, the user leans slightly left causing the first member to displace and the bike frame to accordingly lean slightly left. The first flexible resilient member also returns, in response to removal of the first force, to a neutral orientation or otherwise return the first flexible resilient member to a pre-displacement shape. With a second flexible resilient member opposite (e.g., on the other right side) of the first flexible resilient member, the second flexible resilient member similarly displaces in response to a second force applied to the second flexible resilient member (e.g., when the user leans right while pedaling), the second force corresponding to a second lateral movement of the user of the exercise device.

Yet another aspect of the present disclosure relates to an adjustable stationary bicycle device comprising a telescoping frame post, an adjustable, which may be dual-telescoping, top tube extending forwardly from the frame post, the top tube comprising a seat assembly support adjustably coupled within a rearward end of the top tube to telescope forwardly or rearwardly relative to the top tube and a handlebar assembly support adjustably coupled within a forward end of the top tube to telescope forwardly or rearwardly relative to the top tube.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

Figure 1:
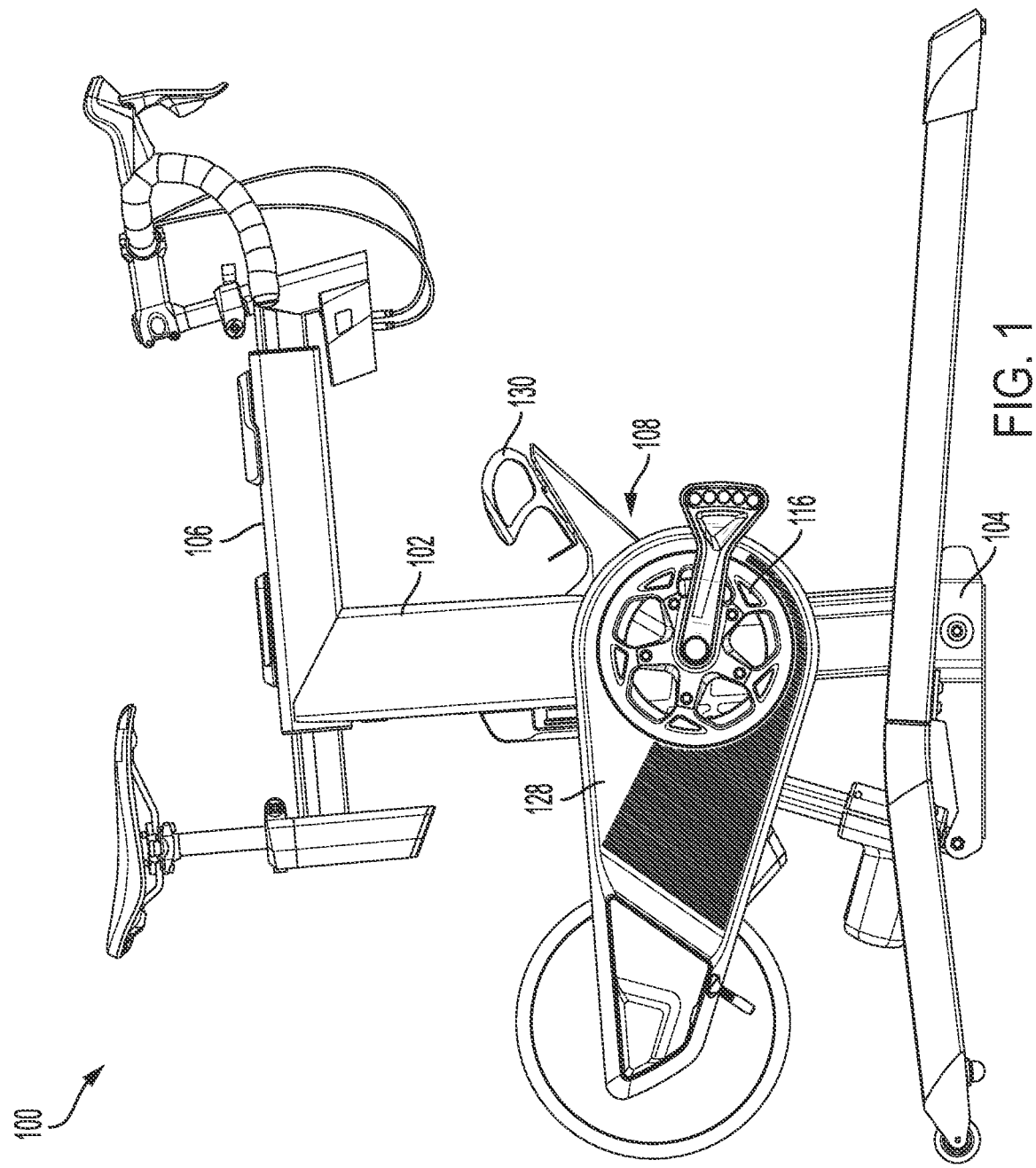
FIG. 1 is a side view of a stationary bicycle training device in accordance with one embodiment.

Aspects of the present disclosure involve an indoor smart training bicycle device that provides several advantages over conventional stationary exercise bicycles. For example, the indoor bicycle provided herein may include a vertically adjustable center post supported on a center foot assembly that may include a tilting mechanism to tilt the center post forward and/or backward to provide climbing or descending simulation. In some instances, the tilting of the frame of the indoor bicycle may be controlled or operated by a controller associated with the stationary bicycle in conjunction with a training program to provide a sense of outdoor riding. The climbing simulation may also be coordinated with resistance control such that resistance increases with climbing simulation and resistance decrease with descending simulation. For example and through the controller, the center post of the stationary bicycle may be tilted, such as by rotating or pivoting, forward to simulate a downhill ride corresponding to a program or display. Similarly, the controller may control the tilt mechanism to tilt the center post backward to simulate an uphill climb corresponding to a program or display showing the avatar of the rider riding a bicycle uphill. When paired with a virtual riding platform, an avatar may be shown descending a hill or ascending a hill synchronously with the physical orientation of the indoor cycle and/or resistance control.

Aspects of the exercise bicycle may further include frame elements allowing an amount of flex in the indoor bicycle such that the indoor bicycle moves side to side while pedaling, which may provide a relatively more comfortable feeling as well as simulate the feel of cycling outdoors on a bicycle. In one example, the indoor bicycle includes a pair of stabilizing legs extending both outward and forward and outward and rearward from the center foot assembly. In a neutral position, with a rider seated, the stabilizing legs hold the indoor bicycle in a vertical orientation. The legs also allow for the indoor bicycle to lean side-to-side if the rider is leaning side-to-side while pedaling, standing to pedal or pedaling hard, among other examples. The side-to-side motion allowed by the stabilizing legs is substantially perpendicular to the forward and after climbing and descending tilt rotation of the indoor bicycle. The side-to-side motion of the stationary bicycle may also emulate or otherwise approximate a leaning movement experienced while turning a bicycle.

In addition to the movement of the stationary bicycle during use described above, the indoor bicycle may also include several degrees of freedom to adjust various configurable dimensions of the frame to properly fit the rider. For example, the center post may be vertically adjustable to extend the length of the center post to various lengths, which has at least the advantage of allowing a rider to adjust the distance to the crank axle and fit the overall height of the frame to that of the rider (beyond that possible simply by adjusting the seat height). A length of a top tube connected to the center post may also be adjusted. In one example, the top tube length is adjusted through a first horizontally adjustable arm extending rearward from the top tube and a second horizontally adjustable arm extending forward from the top tube, which provides for adjusting the top tube length to further customize the fit of the exercise bike to any given rider. The top tube length, like the center post length, provides a mechanism to fit the frame to the size of the rider and grossly defines the distance between the seat and handlebars beyond that possible by only adjusting either the seat position or handlebar position. A bicycle seat post may be connected to the rearward adjustable arm and a handlebar post may be connected to the forward adjustable arm, both of which may be adjusted vertically to adjust the seat height and handlebar height. Movement of the first adjustable arm and the second adjustable arm (either forward or rearward in relation to the top tube) allows the rider or user of the stationary bicycle to select a desired length of the top tube and the distance between the seat assembly and the handlebar assembly of the bicycle. Thus, the stationary bicycle device provides for vertical adjustment points of the center post, the seat post, and the handlebar post and horizontal adjustment of the first adjustable arm and the second adjustable arm, allowing for the ability to, in essence, customize the indoor bike frame. The multiple points of adjustment of the stationary bicycle device, alone or in combination, allows the bicycle fit to be adjusted to many types, sizes, and shapes of various riders.

In some implementations, the dimensions of the stationary bicycle may be set or adjusted based on corresponding dimensions of a user's outdoor bicycle. For example, the seat height and handle bar height (in relation to the position to any reference point on the bicycle), as well as the distance between the seat and the handlebars, may be determined from the user's outdoor bicycle and used to adjust various parts of the indoor bicycle frame to dimensionally match the outdoor bicycle. This is useful for any rider but is particularly useful when the rider has had their outdoor bike fit and they desire to match that fit to the indoor bicycle. In this manner, the stationary bicycle may feel similar to the user's outdoor bicycle by adjusting the dimensions of the indoor bicycle to match the dimensions of the user's outdoor bicycle, or vice-versa. In some implementations, one or more of the points of adjustments of the indoor bicycle may be controlled by a controller providing adjustment signals to motors or other mechanical devices to automatically adjust the points of adjustments to determined dimensions. The determined dimensions may be provided by a computing device to the controller for adjustment of the stationary bicycle, such as via a mobile device or computing device associated with the user's outdoor bicycle that captures the dimensions of the outdoor bicycle (e.g., angles and separation among and between various points of the outdoor bicycle that can be translated to the exercise bicycle). The controller or the computing device may translate the determined dimensions of the outdoor bicycle to one or more settings of the points of adjustment of the stationary bicycle to meet the dimensions of the outdoor bicycle. The controller may also automatically adjust the points of adjustment of the stationary bicycle for different riders of the bicycle such that a single stationary bicycle may be used by several riders, with the bicycle adjusting the dimensions of the bicycle to each rider accordingly.

The indoor bicycle device may also include a crank component that provides for adjusting an effective crank length. Generally speaking and conventionally, the crank arm length is defined by the separation between the crank axle (or corresponding aperture) about which the crank rotates and the pedal aperture, where the pedal is mounted to the crank. The crank arm here includes a pedal aperture for mounting the crank arm and a plurality of holes for mounting the pedal, with each hole providing a different effective pedal length when a pedal is mounted to it. More particularly, the crank arm component may include an arm with a generally triangularly shaped end that includes a plurality of threaded holes arranged along an edge of the triangular end region. By threadably engaging a pedal with one of the plurality of threaded holes of the crank arm, with each hole defining a distinct crank arm length, a crank length may be quickly selected for the stationary bicycle based on a crank arm preference or to match the crank length of the user's outdoor bicycle.

Still other aspects of the indoor bicycle device may aid in creating an "outdoor" feeling while using the indoor bicycle. For example, the indoor bicycle may include a flywheel/motor assembly for controlling resistance, being responsive to conditions in a virtual environment, and a myriad of other possibilities for outdoor simulation, game play, training, etc. Generally speaking, the cranks are coupled to a drive sprocket (gear) which is in turn coupled with the flywheel/motor assembly through a belt, chain, or other mechanism. The flywheel is used to simulate inertia and momentum of a conventional bicycle. To enhance controllability, the motor may drive the flywheel or provide a resistance force to the flywheel. While it is possible for the system to work with only the flywheel, albeit with a relatively larger flywheel better simulating the inertia and momentum of an adult rider given the relatively larger weight of the same, or without a flywheel, using both a flywheel and motor combination provides control flexibility and ride feel. In some examples, the motor may be activated to turn the flywheel to simulate downhill riding or coasting—e.g., simulating the ease of pedaling and speed that occur when going downhill on a bicycle. Similarly, the motor may apply an opposing force—a braking force—to the flywheel assembly to simulate uphill riding—simulating the resistive forces of gravity, for example, when riding uphill. The forces applied to the flywheel by the motor assembly may also be utilized to simulate different gear ratios or gear shifting of an outdoor bicycle. In particular, one or more electronic shifters may also be included with the stationary indoor bicycle device. The electronic shifters may include one or more activators that may be programmable to provide various results when activated. In this manner, the shifters may be configured to mimic or approximate shifters that a rider may use in connection to the "outdoor" bicycle. In addition, the stationary bicycle may simulate the experience of a change in a gear ratio in response to activation of the shifter through control of the motor in relation to the flywheel assembly—e.g., rather than actually shifting gears like in an outdoor bike, when a user activates the electronic shifter, the motor is controlled to simulate the feel of either shifting up or down by altering the resistance applied by the motor. Of course, this effect may further be overlaid in the environment accounting for speed, slope, rider weight, virtual drafting, and the like. The stationary bicycle therefore may include several features to provide a realistic feel to the stationary bicycle when used by a rider for such uses as simulating riding outdoors, to simulate indoor track riding, to accompany a virtual riding program (such as a training program, an online video game), and the like.

Figure 2:
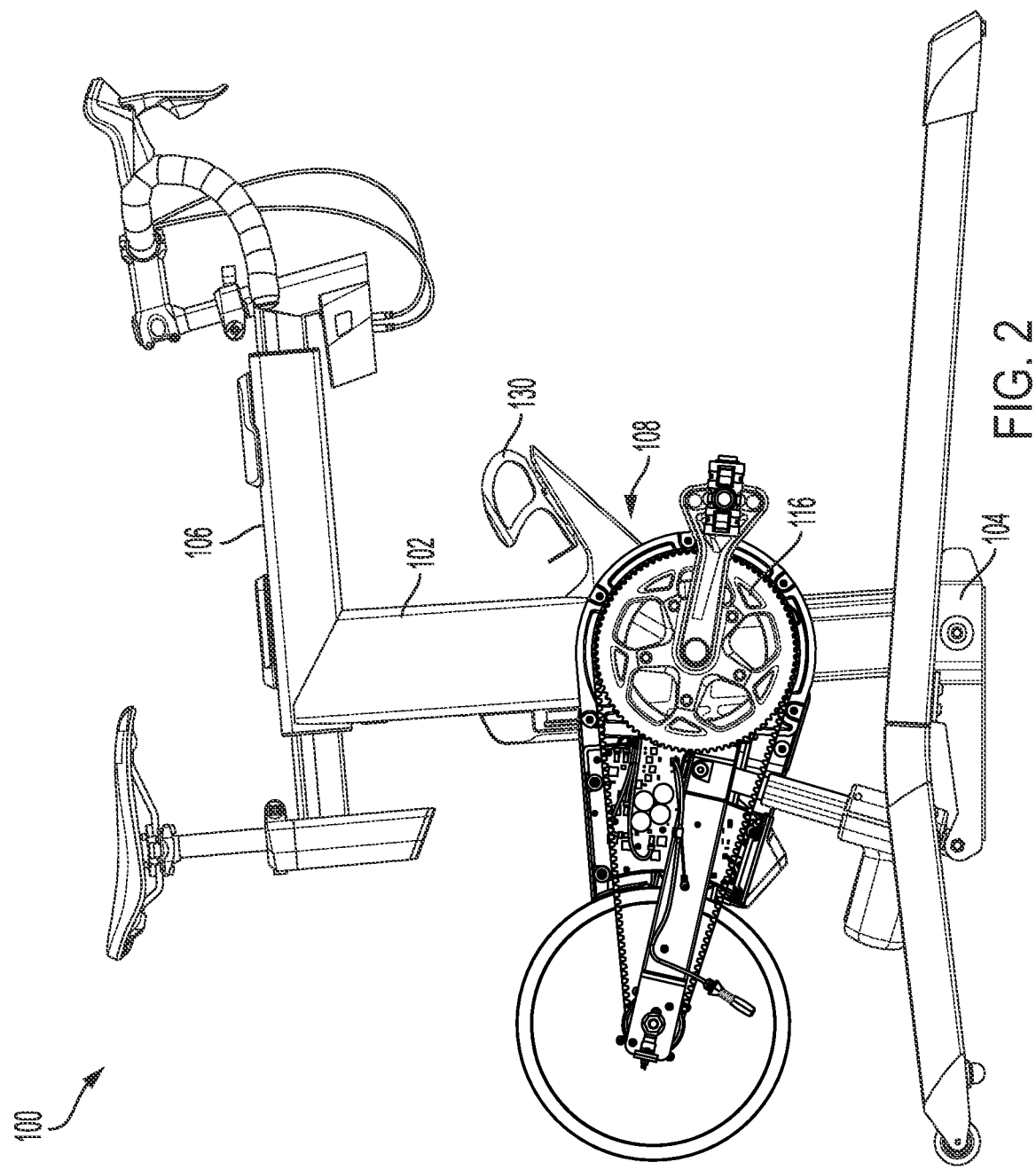
FIG. 2 is a side view of a stationary bicycle training device illustrating a control circuit and drive mechanism in accordance with one embodiment.
Figure 3:
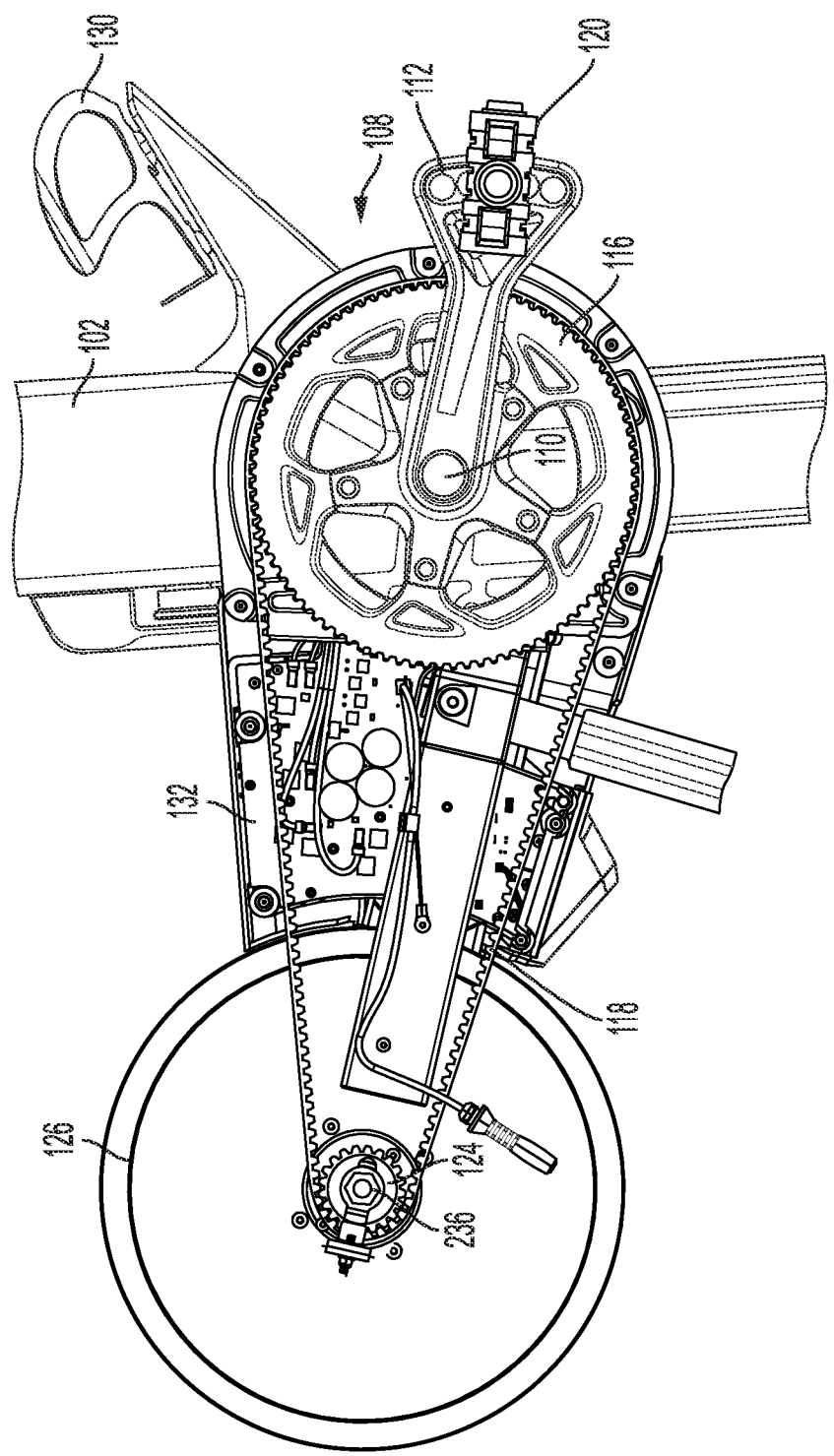
FIG. 3 is a side view of the control circuit and drive mechanism of the stationary bicycle training device of FIG. 2 in accordance with one embodiment.
Figure 4:
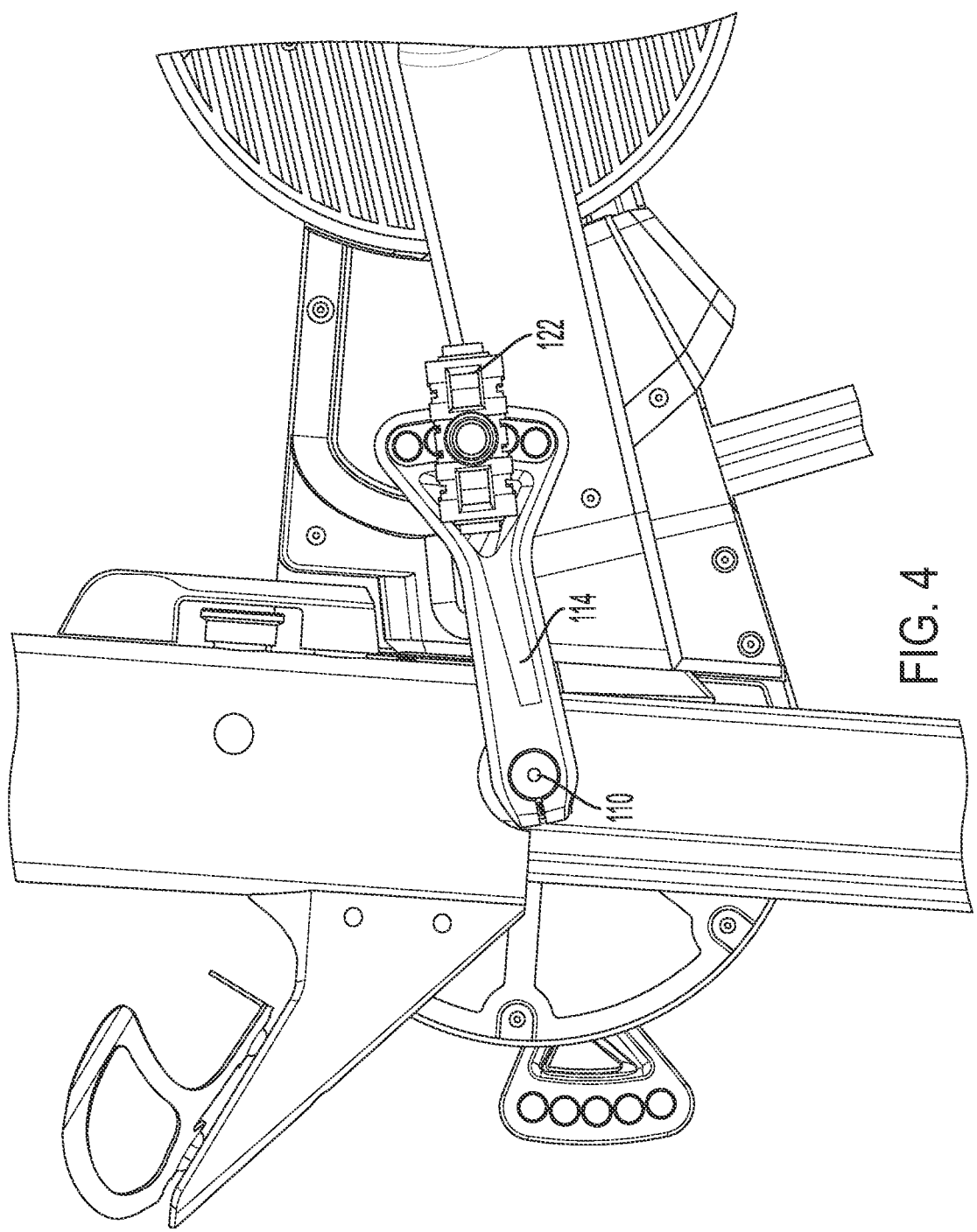
FIG. 4 is an opposing side view of the stationary bicycle training device illustrating a crank arm and pedal assembly of the bicycle in accordance with one embodiment.
Figure 5:
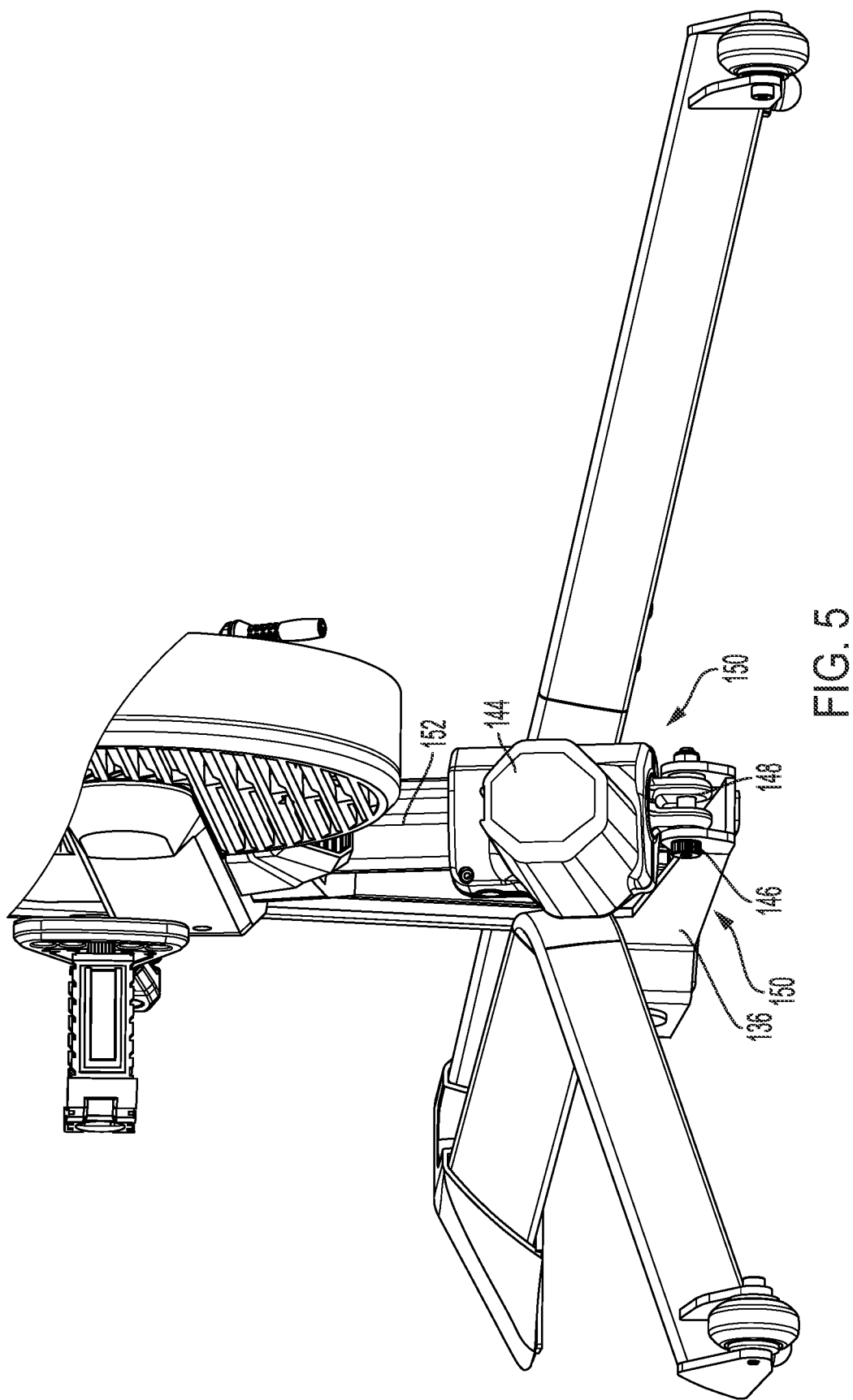
FIG. 5 is an isometric view of a bottom rear portion of the stationary bicycle training device illustrating tilting mechanism in accordance with one embodiment.
Figure 6:
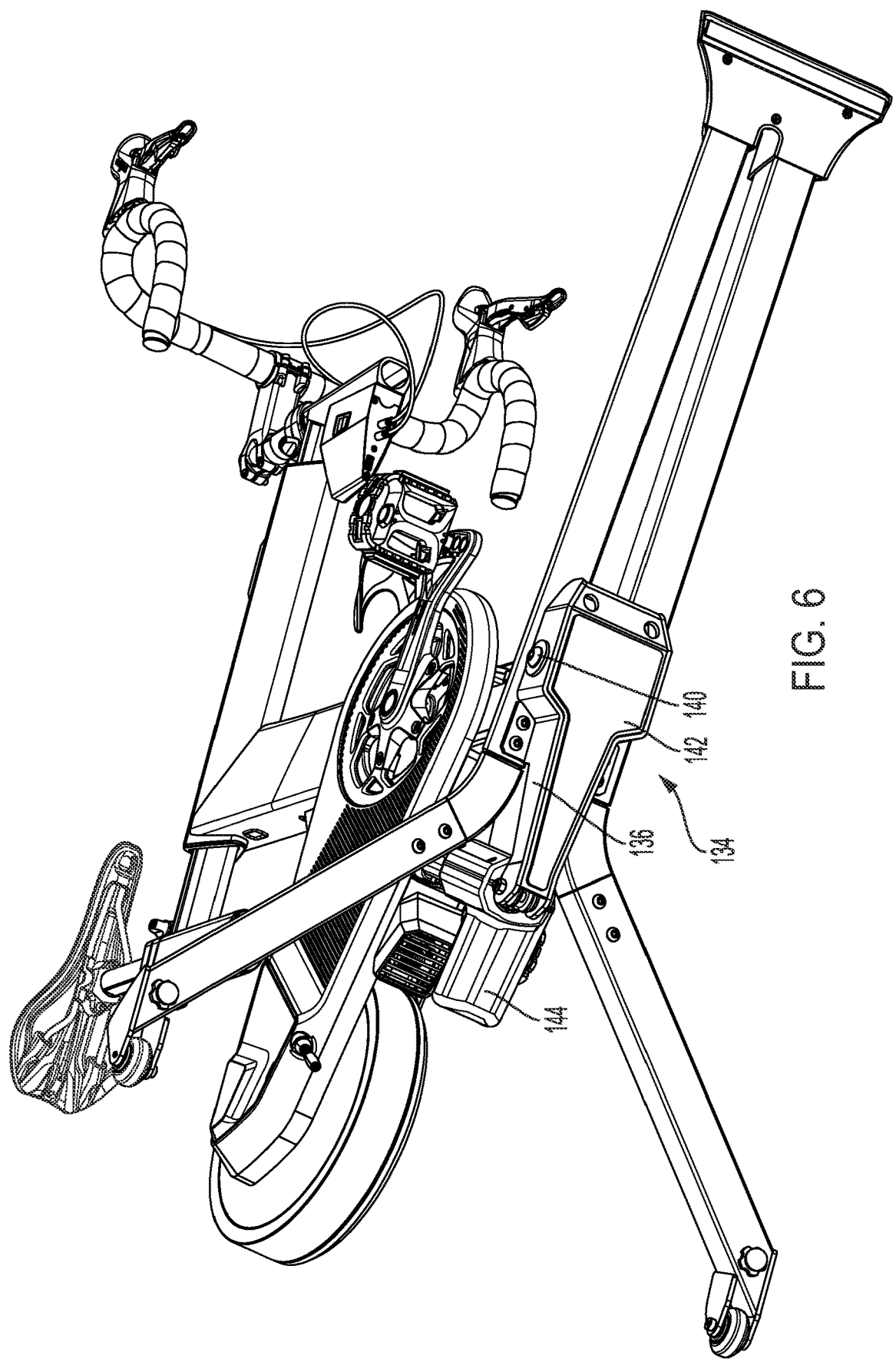
FIG. 6 an isometric view of the bottom of the stationary bicycle training device illustrating a center foot assembly in accordance with one embodiment.
Figure 7:
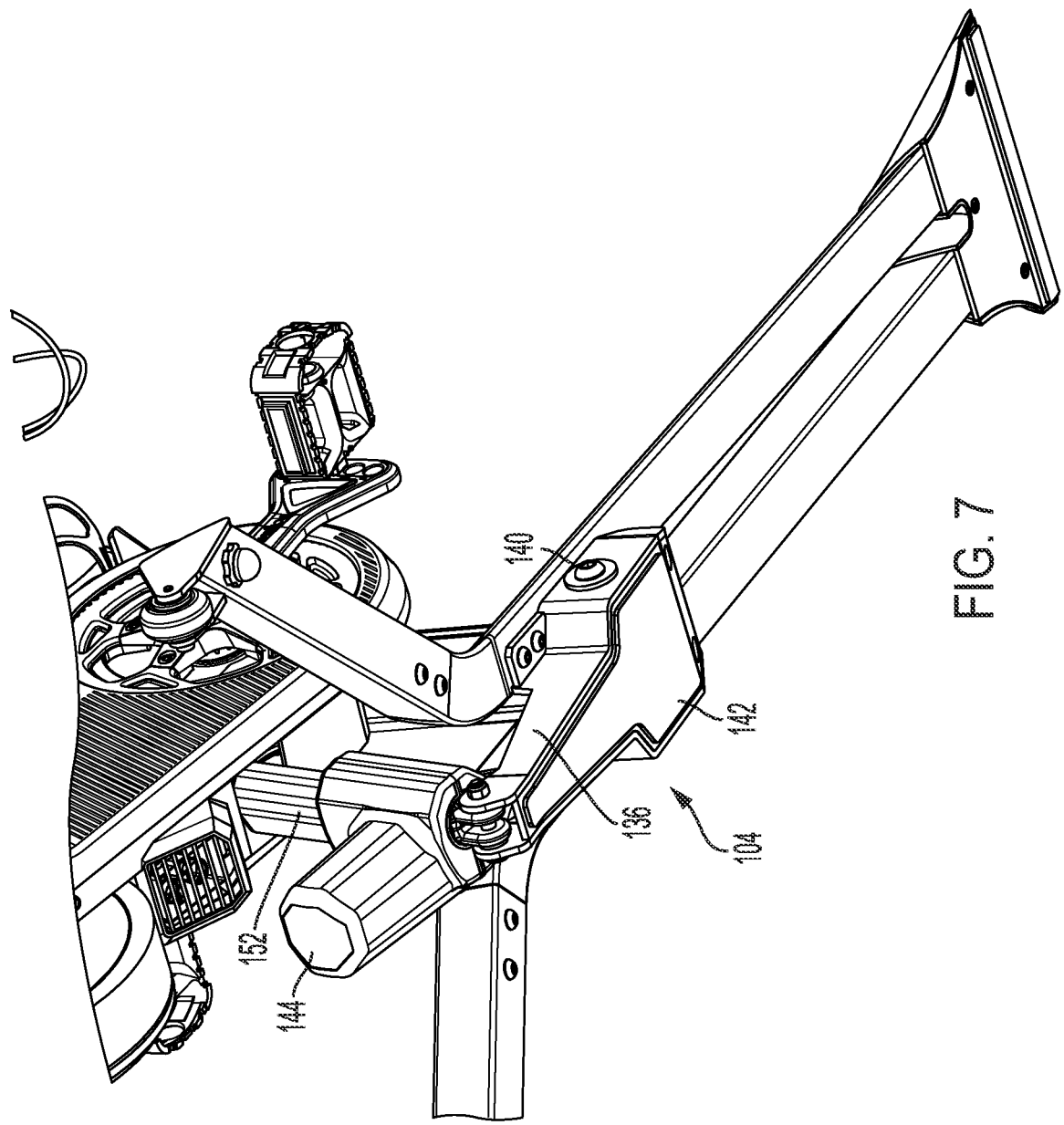
FIG. 7 an isometric view of the bottom rear portion of the stationary bicycle training device illustrating a connection between the tilting mechanism and the center foot assembly in accordance with one embodiment.
Figure 8:
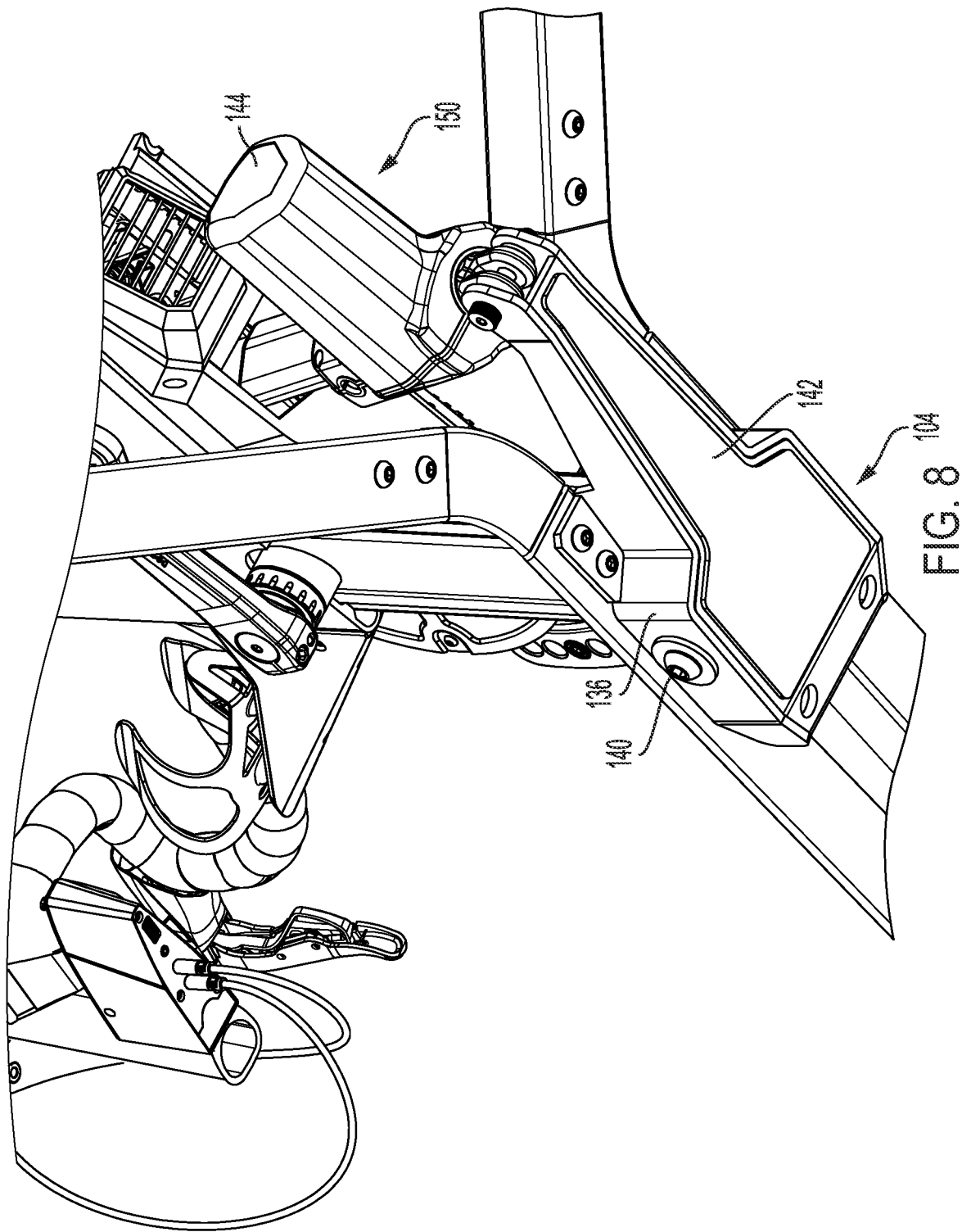
FIG. 8 an isometric view of an opposing side of the bottom rear portion of the stationary bicycle training device illustrating a connection between the tilting mechanism and the center foot assembly in accordance with one embodiment.
Figure 9:
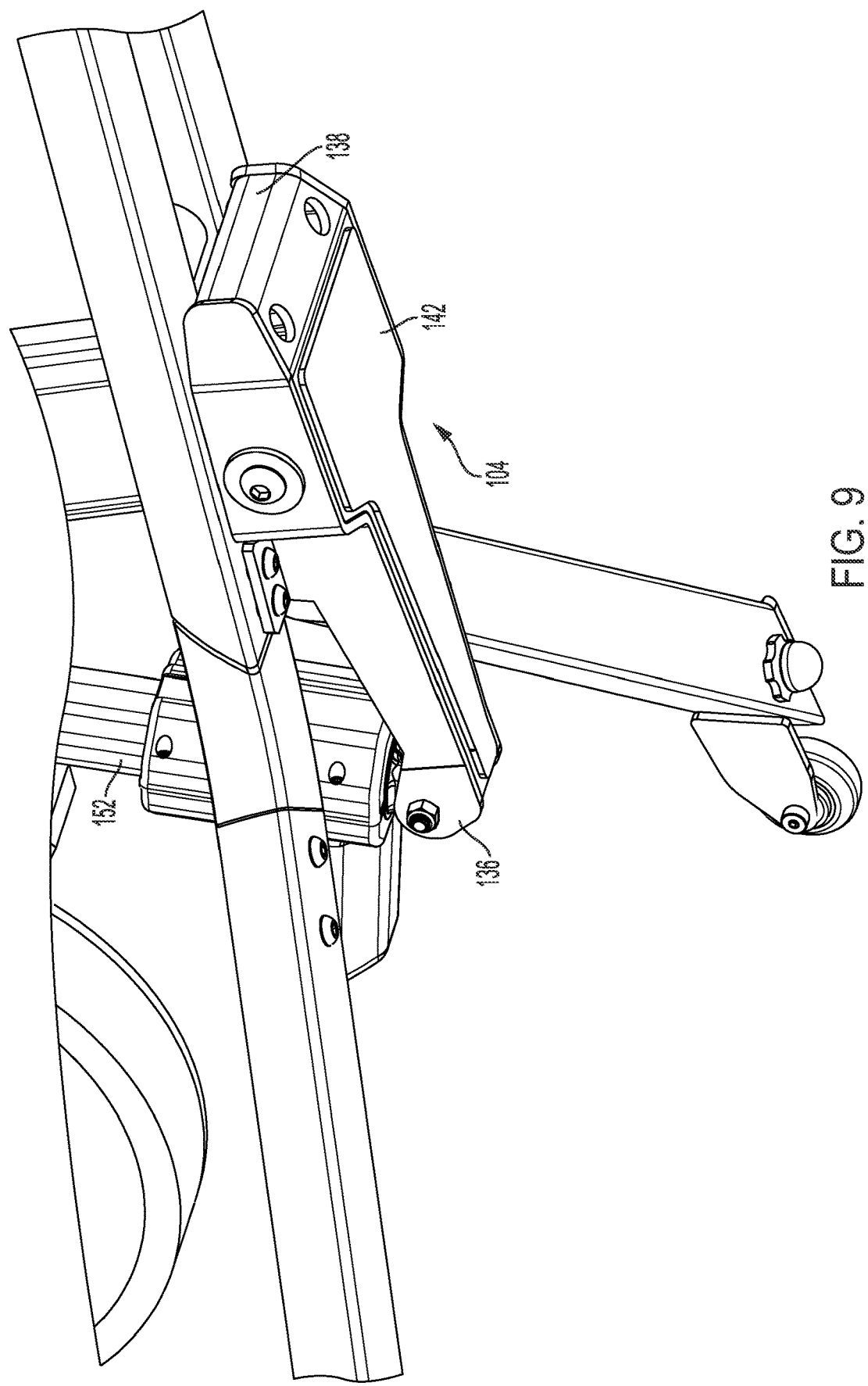
FIG. 9 an isometric view of the bottom rear portion of the stationary bicycle training device illustrating components of the center foot assembly in accordance with one embodiment.

Referring now in more detail to the Figures. FIGS. 1-2 illustrate a stationary bicycle 100 that includes an adjustable post 102 extending vertically from a foot assembly 104. The post 102 is oriented slightly rearward. A top tube 106 is attached to a top end of the center post 102 above the center foot assembly. In some instances, the top tube 106 may be welded or otherwise connected to the center post 102. The top tube 106 generally extends forward from the top end of the center post 102. In the example shown, the top tube is also roughly perpendicular the center post but it may define some angle greater or lesser than 90 degrees relative the center post. Aspects of the top tube 106 are discussed in more detail below, including multiple mechanisms for adjusting the length of the top tube 106 and other dimensions of the indoor bicycle 100 associated with the top tube 106. As best seen in FIGS. 1-4, a drive assembly 108 is supported on a first side of the center post 102, which may be the right side from a perspective of a rider seated on the device. The drive assembly 108 may include a drive sprocket 116 connected to a crank axle 110. The drive sprocket 116 is configured to turn a belt, but may also be configured for a chain. In the example shown, the drive sprocket 116 is circular, but may also be elliptical. The crank axle 110 extends through the center post 102, where it is rotatably supported in a bottom bracket, and supports a first crank arm 112 and a second crank arm 114. A first pedal 120 may be connected to the first crank arm 112 and a second pedal 122 may be connected to the second crank arm 114. By applying a downward force on the respective pedals 120, 122, a rider may cause a corresponding rotation of the crank axle 110 and rotation of the drive sprocket 116 about a rotation axis through the center of the crank axle 110. The drive sprocket 116 may include teeth extending from its outer circumference and that engage with corresponding treads on an inner surface of a belt drive 118 such that rotation of the drive sprocket 116 causes rotation of the drive belt 118.

The drive belt 118 is also connected to the outer circumference of a rear gear (or sprocket) 124 with a smaller diameter than the drive sprocket 116. The rear gear 124 is located generally rearwardly from the drive sprocket 116 and, similar to the drive sprocket 116, includes teeth extending from an outer circumference surface of the rear gear 124 to engage with corresponding teeth of the drive belt 118. The rear gear 124 is operably engaged with a flywheel/motor assembly 126 (discussed in more detail below) such that rotation of the drive belt 118 causes corresponding rotation of the rear gear 124 and, in turn, rotation of the flywheel. In this manner, a rider of the stationary bicycle 100 may pedal the drive assembly 108 to cause rotation of the flywheel/motor assembly 126. As seen in FIG. 1, a protective cover 128 may be included over the drive belt 118 to prevent access to the drive assembly 108 during use. In some embodiments, a water bottle cage 130 may extend upward and forward from a front surface of the center post 102.

Returning to FIG. 3, a control circuit board 132 comprising multiple control components may be supported on a rear surface of the center post 102. Components of the control system for the stationary bicycle 100 discussed further herein may be included in or otherwise supported on the control circuit board 132 for executing one or more drive control programs, sensor signal processing, riding simulation algorithms or programs, and the like. In general, the control circuit board 132 may include components of a computing device, including memory components, processing units or components, electrical signal processing components, and the like for executing one or more programs associated with the operation and control of the indoor bicycle 100.

Referring to FIG. 1, and FIGS. 5-10 among others, as mentioned above, one such control feature of the stationary bicycle 100 includes a forward and/or rearward tilting of the center post 102, which serves to orient the indoor bicycle to simulate an uphill or downhill riding position of a traditional bicycle. The tilting of the center post 102 may be controlled through the tilting mechanism 150 connected to the lower end of the post 102 and the center foot assembly 104. As best shown in FIG. 6-9, the center foot assembly 104 defines a generally inverted T-shape and includes a flat bottom surface 134 and side walls 136 and a rounded front wall 138 (shown in FIG. 9) that extend upward from the bottom surface 134. The side walls 136 define a channel between the walls, with the channel oriented upward and spaced to receive the bottom end of the center post 102. More particularly, a center post mounting pin 140 extends through the side walls 136 of the center foot assembly 104 and through the center post 102 near the bottom end of the center post to pivotally support the center post 102 to the center foot assembly 104. The center post mounting pin 140 allows the center post 102 to rotate about the pin 140 in a forward or rearward rotation to allow the indoor frame to tilt forwardly or rearwardly to simulate a descending or climbing frame orientation. The pin is supported in suitable bearing arrangements secured in the respective center post and foot assembly. Thus, in addition to connecting the center post 102 to the center foot assembly 104, the center post mounting pin 140 provides an axis of rotation for the tilting movement of the center post 102 of the stationary bicycle 100. In some instances, a foot pad 142 of a hard plastic material may be included on the bottom surface 134 of the foot assembly 104 to provide a base upon which the center post assembly engages whatever surface the indoor cycle is positioned.

Figure 10:
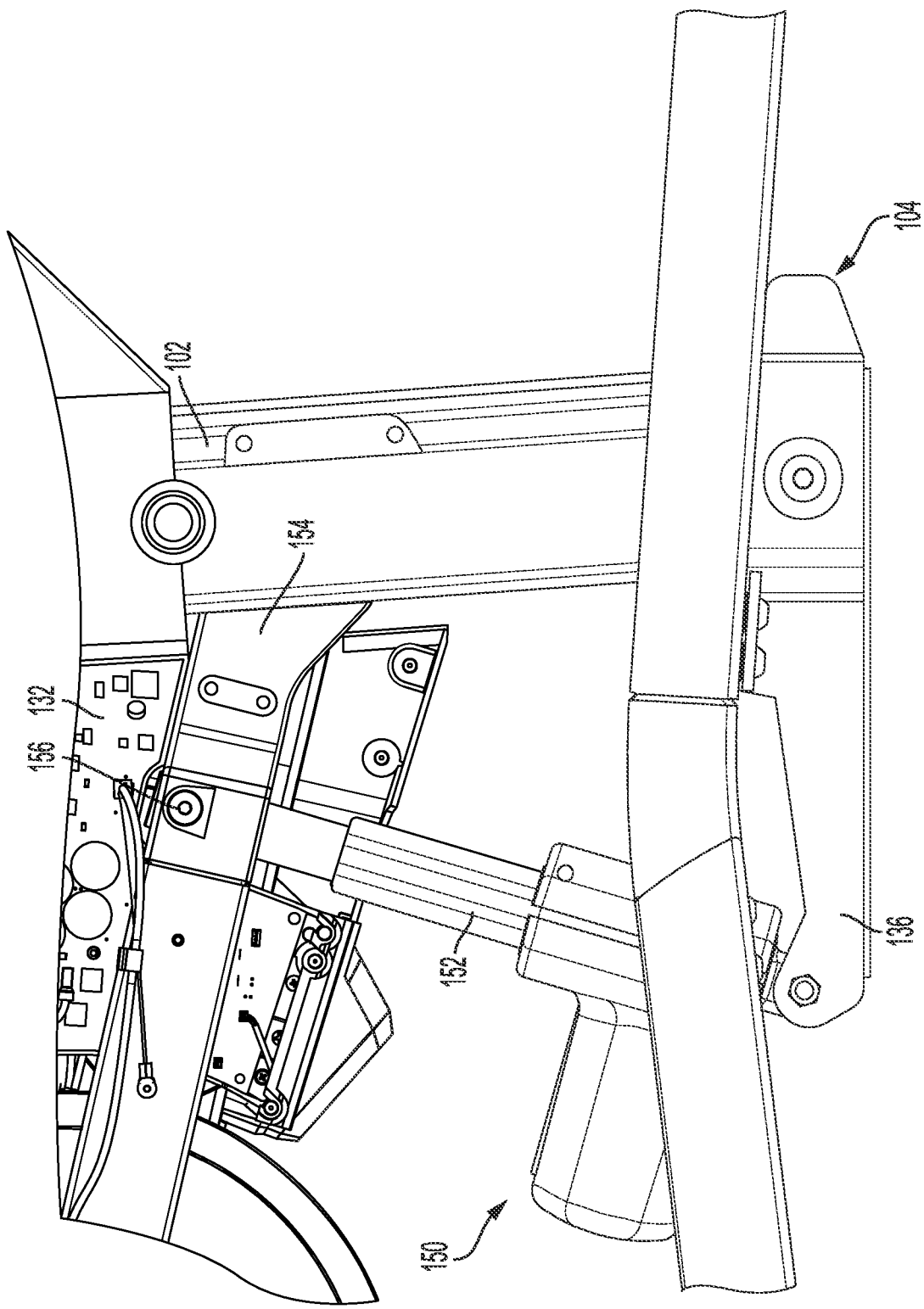
FIG. 10 is a side view of the tilting mechanism of the stationary bicycle training device for tilting a center post in accordance with one embodiment.
Figure 11:
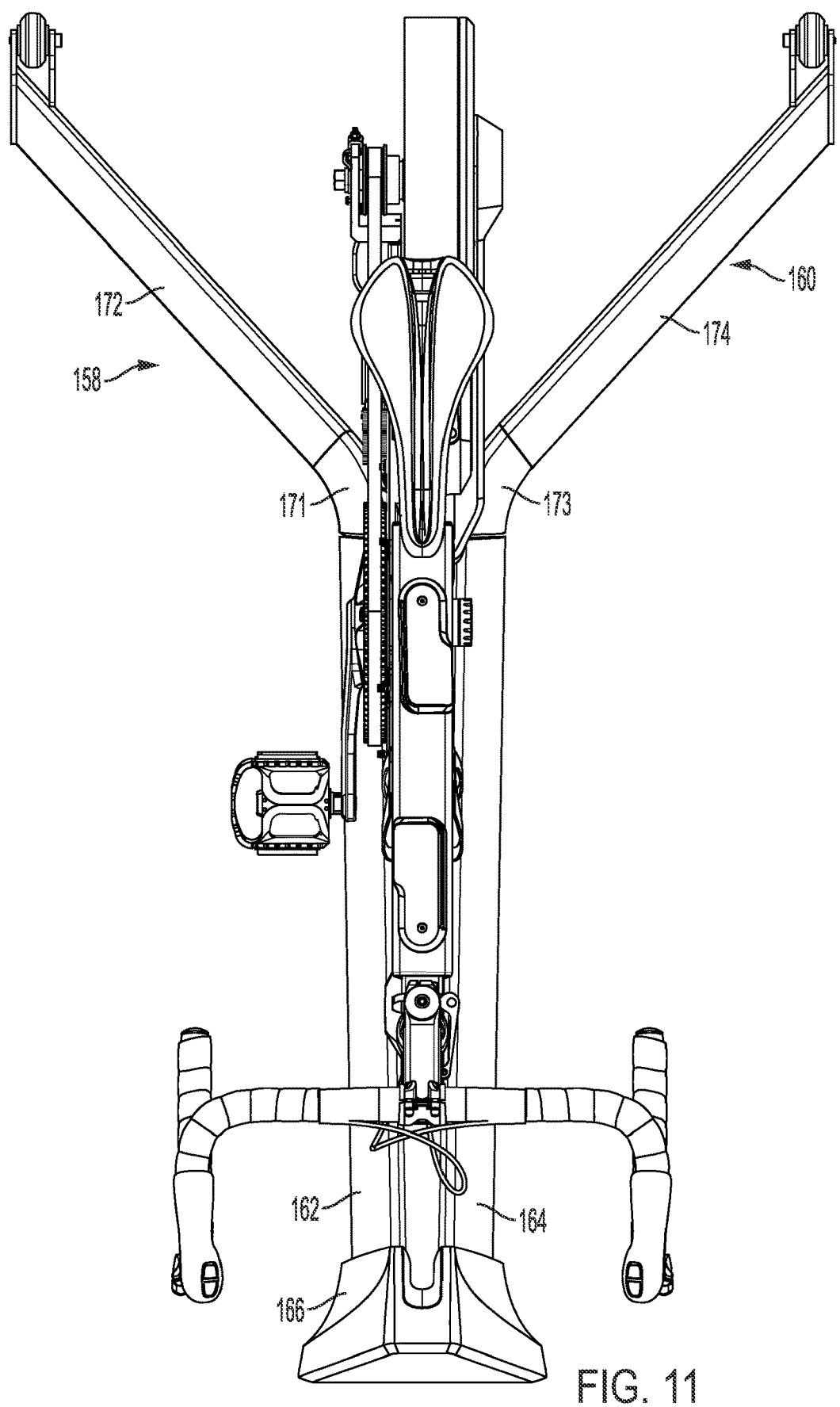
FIG. 11 is a top view of the stationary bicycle training device illustrating the support legs extending from the body of the device in accordance with one embodiment.
Figure 12:
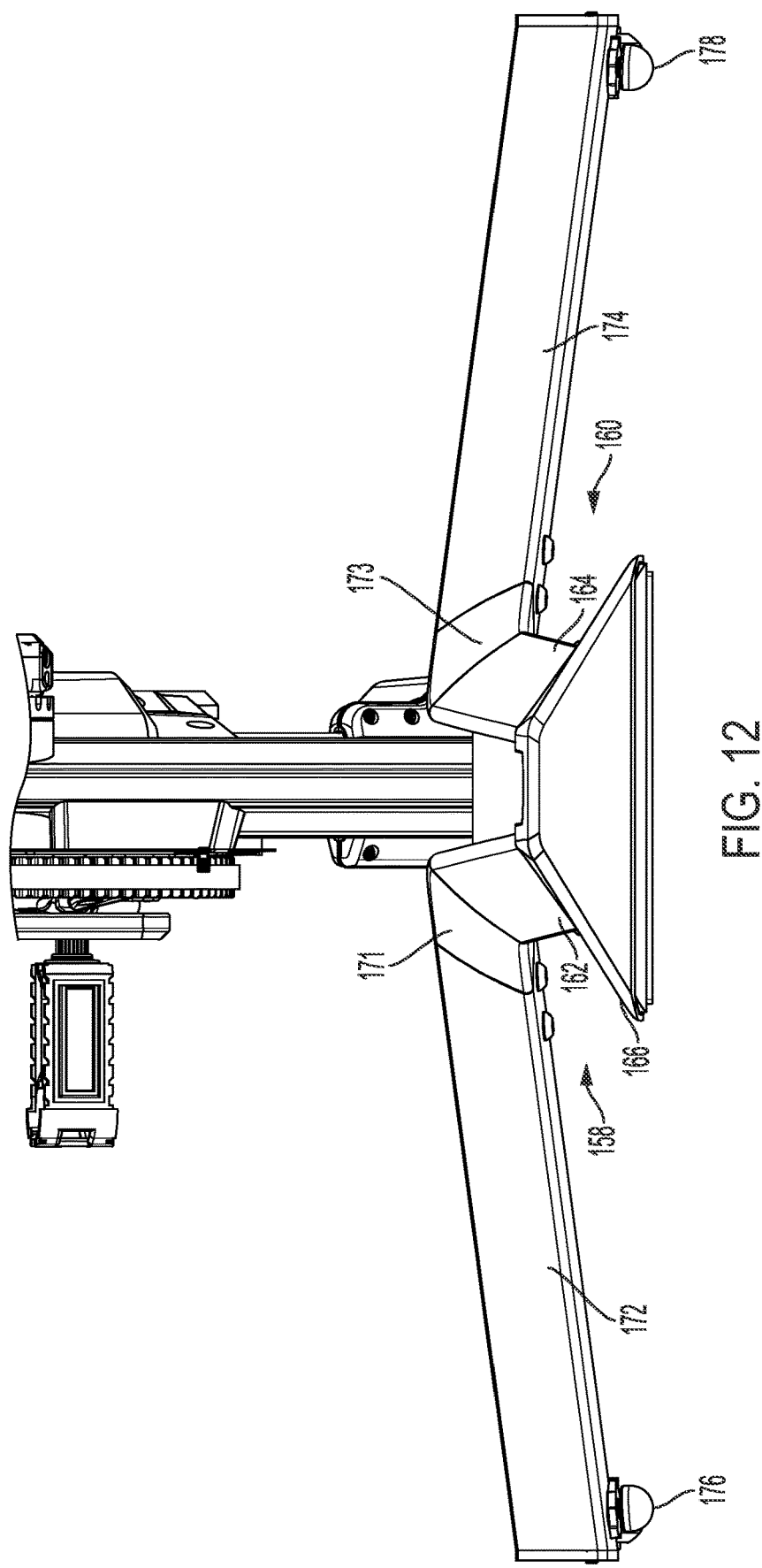
FIG. 12 is a front view of the stationary bicycle training device illustrating the support legs extending from the body of the device in accordance with one embodiment.

The tilting mechanism 150 is coupled between the foot assembly and the center post, and may involve a motor driven post 152 that extends or retracts to pivot the post 102 about the pivot pin 140. More particularly, the tilting mechanism 150 may be rotatably supported at the rearward end of the center foot assembly 104. While the tilting mechanism is oriented to the rear of the center post, it may also be positioned forward the post. In one example, the rotatable support is achieved in a similar pin and bearing arrangement as the center post 102 is connected to the center foot assembly 104. In particular, a tilting drive mounting pin 146 may extend through the side walls 136 of the center foot assembly 104 and through a pair of mounting loops 148 extending from the bottom of a housing of a tilting drive motor 144. The tilting mechanism 150 is allowed to pivot or rotate around the tilting drive mounting pin 146 forwardly or rearwardly. Other rotatable connections between the tilting mechanism 150 and the center foot assembly 104 are possible. The tilting drive motor 144 may include a stepper motor drive to extend or retract a shaft 152. As best seen in FIG. 10, the shaft 152 is connected at a lower end to the tilting drive 144 and at an upper end to a bracket 154. The shaft 152 connects to the bracket 154 by a tilting bracket pin 156 that extends through the bracket 154 and the upper end of the shaft 152 to provide for rotational movement of the shaft 152 about the bracket pin 156. A forward portion of the bracket 154 connects to the center post 102 and may, in some instances, be welded to the center post 102.

To tilt the center post 102 and simulate an uphill or downhill orientation of the indoor bicycle 100, the tilting drive 144 receives one or more control signals from the control component 132 of the stationary bicycle 100 to cause the drive 144 to extend or retract the shaft 152. Extension of the shaft 152 tilts the center post 102 forward around the axis of rotation of the center post mounting pin 140. Corresponding rotation about the bracket pin 156 and the drive mounting pin 146 also occurs as the center post 102 tilts forward. Retraction of the shaft 152 by the tilting drive 144 generates an opposite tilting movement of the center post 102 rearward. In this manner and through the control of the tilting mechanism 150, the center post 102 of the stationary bicycle 100 may be tilted forward and rearward. Tilting the center post 102 forward simulates the orientation of an outdoor bicycle being ridden on a downward slope and tilting the center post 102 rearward simulates the orientation of an outdoor bicycle being ridden on an upward slope. During tilting of the stationary bicycle 100, the center foot assembly 104 may remain flat or otherwise not move to provide a stable support base for the bicycle. In some instances described in more detail below, the tilting of the center post 102 through the tilting mechanism 150 may correspond to a program displaying an avatar of the rider of the stationary bicycle or other riding simulation program in response to the program illustrating riding up or down a slope within the program to further simulate the experience of riding an outdoor bicycle. Similarly, uphill and downhill position simulation may be accompanied by corresponding changes in the flywheel motor control. One example control mechanism for activating or otherwise controlling the tilting of the center post 102 is included as described in Untied States Patent Application 2019/0022497 to Wahoo Fitness, LLC, the contents of which are incorporated herein in its entirety.

Other tilting mechanisms may also or alternatively be included on the stationary bicycle 100. For example, the tilt drive 144 may include any type of actuator to extend or retract the tilt shaft 152, such as a linear actuator, preferably mechanical but pneumatic or hydraulic are also possible or any other motor that drives a piston, a stepper motor, a screw drive, or any other mechanical device that actuates the extension and retraction of the shaft. Further, the tilt drive 144 may be located in various locations on the stationary bicycle 100, such as at the upper end of the center post 102, in front of the center post, adjacent to center post, etc. In still other instances, the tilting mechanism 150 may not include a tilt shaft but may instead rotate the center post 102 in response to the drive signals. For example, a rotational drive may be in communication with the tilting drive mounting pin 146 to rotate the center post 102 in a forward or backward rotation about the mounting pin 146. In still further instances, additional portions of the stationary bicycle 100 frame may be tilted forward or backward to simulate the uphill or downhill riding. In general, any mechanism that is coupled with the indoor bicycle and may actuate to tilt the center post about the pivot pin may be incorporated into the bicycle to simulate the uphill or downhill experience.

As shown in FIGS. 11-15, among others, the stationary bicycle 100 may also include a pair of support legs 158, 160. From the perspective the center foot assembly area, each leg includes a portion extending forwardly and a portion extending rearwardly and outwardly. Generally speaking, each leg provides fore and aft support and also provides support to one side of the frame—e.g., laterally—the other leg supporting the other side. In the area of the center foot assembly, at apex regions between the forwardly and rearward/outward portion of each leg, the legs are above the support surface and extend down at a shallow angle to engage the surface at the respective forward and rearward/outward ends. The legs are configured to provide lateral (side-to-side) and fore and aft stability to the stationary bicycle 100. In the instances illustrated, each support leg 158, 160 comprises a front straight portion 162, 164 and a rear angled portion 172, 174. Each support leg 158, 160 functions in a similar manner to provide stability support to the stationary bicycle 100. The legs also provide side-to-side stability with designed flex to accommodate some side to side frame movement, which simulates the side to side movement when pedaling an outdoor bicycle particularly in heavy sprinting conditions and standing to pedal. Generally speaking, as a rider shifts weight to one side or the other when pedaling, force is transferred through the connection of the frame to cause the apex area of whichever support leg the rider has shifted toward to deflect slightly downward allowing the indoor cycle to slightly lean to whatever leg has deflected downward.

In particular, the support legs 158, 160 include the front straight portion 162, 164 that extend forward and slightly downward from the center foot assembly 104. The forwardly extending portions are substantially parallel with the top tube. The support legs 158, 160 are supported on or are otherwise connected to an upper surface of the walls 136 of the center foot assembly 104 opposite the bottom surface 134. As such, the front straight portion 162, 164 of the legs 158, 160 angle downward from the top surface of the center foot assembly 104 at a proximal end to contact the ground at a distal end of the straight portions 162, 164 to provide a front support contact point with the ground. In one embodiment, the distal or front end of the straight portion 162, 164 may extend to a level parallel to the bottom surface 134 of the center foot assembly 104. A front foot pad 166 may connect the front or distal ends of the straight portions 162, 164 of the support legs 158, 160 together and provide a cushioned front support to the stationary bicycle 100. In alternate embodiments, each support leg 158, 160 may include a separate front foot pad on which the stationary bicycle 100 rests. The front foot pad 166 may have a generally triangle-shaped base with sides extending upward and tapered toward the rear of the stationary bicycle 100. One or more soft pads may be located on the bottom surface of the front foot pad 166 to cushion the stationary bicycle when placed upon the ground. Two channels 170 may be located at the rear of the front foot pad 166 to accept the distal or front ends of the front straight portion 162, 164 of the legs 158, 160.

Each support leg 158, 160 may also include a rear portion 172, 174 that extends rearward from the foot assembly 104. Each leg includes a curved or apex region between the front and rear portions. From the curved sections 171, 173, the rear portions extend both rearwardly and outwardly away or flared from the foot assembly 104. Each leg is supported on or are otherwise connected to the upper surface of the walls 136 of the center foot assembly 104 opposite the bottom surface 134. The rear portions extend outward slightly rearward of where the legs are supported on the center foot assembly. The rear portions of each leg 4 angle downward relative to the top surface of the center foot assembly 104. A distal end of the rear portions 172, 174 of the support legs 158, 160 may include a circular rear support foot 176, 178 extending downward to provide a rearward support for the stationary bicycle. In some embodiments, wheels 180 may be supported on the distal ends of the rear portions 172, 174 of the support legs 158, 160 to aid in moving the stationary bicycle 100 from location to location.

Figure 13:
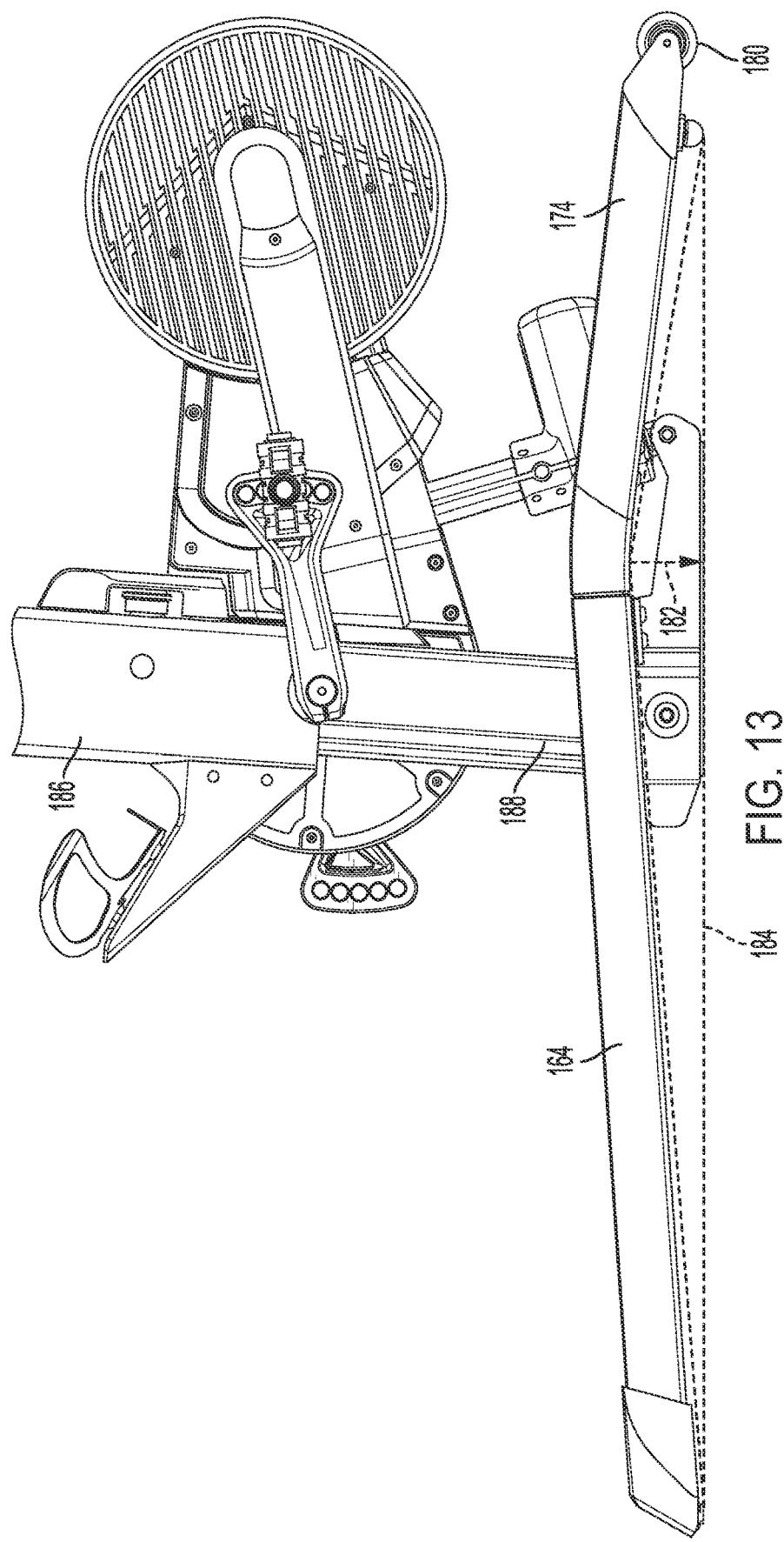
FIG. 13 is a side view of the stationary bicycle training device illustrating the support legs extending from the body of the device in accordance with one embodiment.
Figure 14:
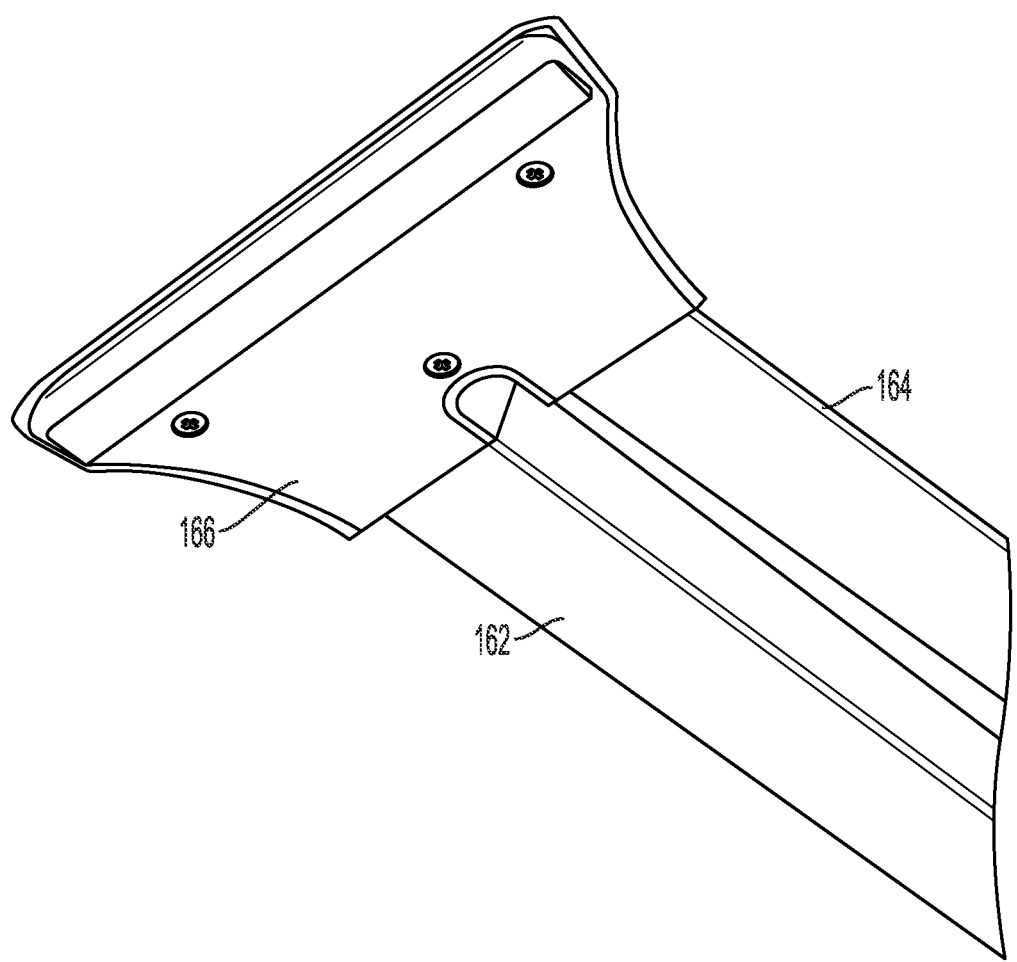
FIG. 14 is an isometric bottom view of a front foot pad connected to the support legs of the stationary bicycle training device in accordance with one embodiment.
Figure 15:
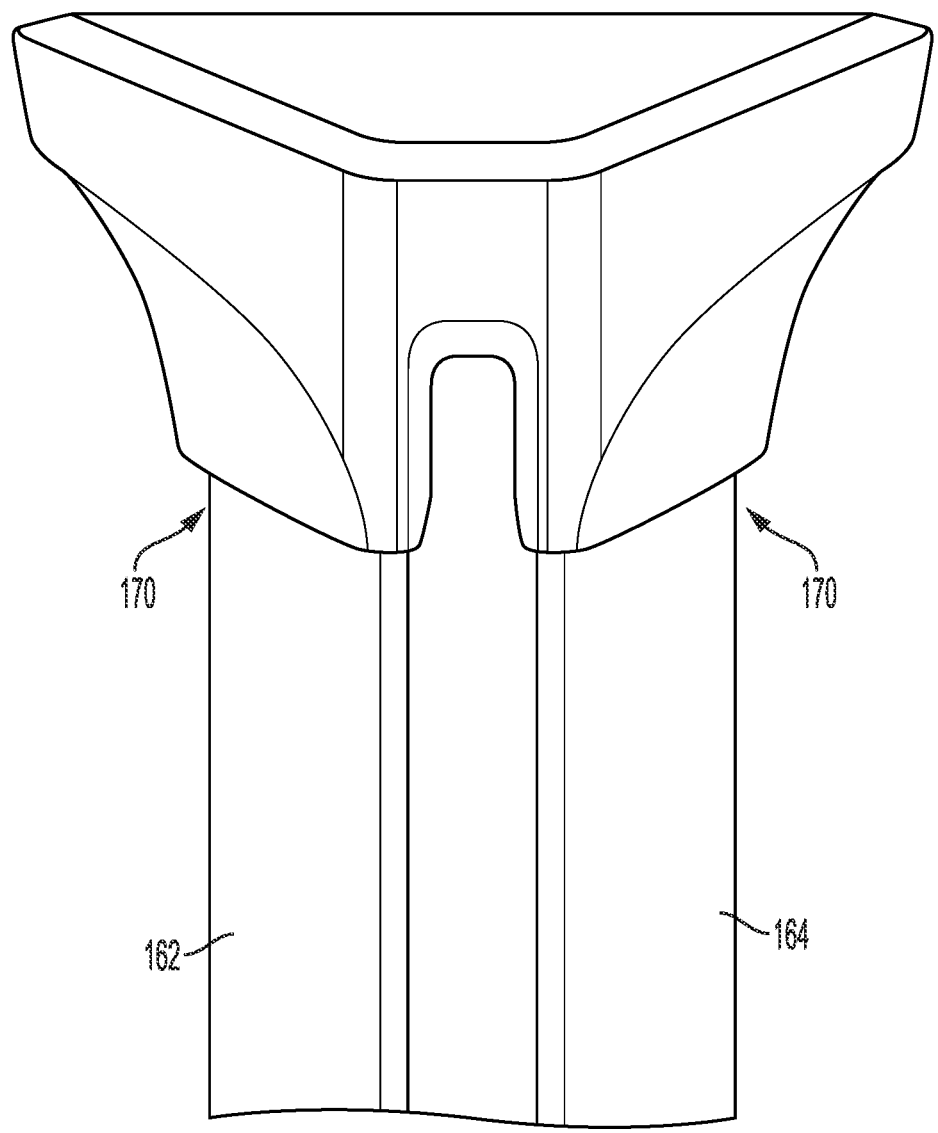
FIG. 15 is a top bottom view of the front foot pad connected to the support legs of the stationary bicycle training device in accordance with one embodiment.

As described, the stationary bicycle 100 is primarily supported by the center foot assembly 104 below the center post 102 as the weight of the frame and of a rider is transferred to the center foot assembly and its support on the ground. The legs provide both vertical and lateral support. While operating the indoor bicycle 100, a rider's weight may oscillate in a side-to-side motion in response to the pedaling movement executed by the rider. In other words, as the rider applies the downward force on a side of the bicycle 100 to push the pedal and rotate the drive sprocket 116, the rider's weight may momentarily shift to that side, which can be particularly pronounced when sprinting or standing to ride. Stated differently, the rider may shift laterally right and left, from the perspective of a rider facing forward, which correspondingly causes the correspondingly flexible resilient legs, positioned respectively below and to the right or left of the seat and rider, to each deflect downwardly when the weight is to the right or left respectively, allowing the vertically oriented center post to pivot side to side slightly simulating the side to side movement of an outdoor bike when riding. Even though a rider may be seated, the lateral movement of the torso, if even slight, may be sufficient to cause some slight deflection in which support leg the rider weight is transferred over. This rider movement may shift the center of gravity of the rider slightly from the center of the bicycle 100 (generally along the center post 102) to the side of the bicycle 100 in which the force is being applied. As the center of gravity shifts to one side, the stationary bicycle 100 may provide for the center post 102 (and other components of the bicycle) to lean in the direction of the rider's weight shift, applying a corresponding downward pressure on a support leg 158, 160 causing deflection of the same. In some embodiments, the support legs 158, 160 may be constructed from a semi-rigid material such that the legs may flex in a downward movement (similar to a damped leaf-spring structure) as the rider's weight is shifted to one side (as illustrated by arrow 182 of FIG. 13) and be similarly resilient such that the leg returns to its neutral shape when the force is removed. More particularly and when the stationary bicycle is placed on a flat surface as shown in FIG. 13, the support legs 158, 160 and the floor (or other surface upon which the bicycle 100 rests) form a triangle-shaped support structure 184. As a force is applied at the top of the support triangle 184 due to the shifting of weight of the rider to one side of the stationary bicycle 100, the straight portion 164 and the rear angled portion 174 of the support leg 158 may flex as the top of the support triangle moves closer to the surface on which the stationary bicycle 100 is placed. In general, the apex of the support triangle 184 is aligned with the center of gravity of the stationary bicycle 100 (region including the center post 102, drive assembly 108, flywheel/motor assembly, etc.) such that the leaning lateral forces are concentrated at the apex of the support triangle 184. Although some flexing in the support leg 158 occurs, the support leg 158 and center post 102 may remain rigid enough to retain the stationary bicycle 100 in a mostly upright position, while providing some side-to-side leaning during the pedaling action. This movement may approximate a similar side-to-side lean of an outdoor bicycle. Therefore, rather than providing a rigid frame design that provides essentially no side-to-side movement, the stationary bicycle 100 described herein incorporates such movements for additional approximation of the feeling and/or physical benefits (e.g., abdominal core, shoulders, joints, etc.) of outdoor cycling.

In a similar manner, the front portions 162, 164 of the support legs 158, 160 may also provide some forward and rearward movement or flex of the stationary bicycle 100, in addition to the tilting of the center post 102 discussed above through the tilting mechanism 150. In particular, a shift of the rider's center of gravity forward may cause a similar, albeit slight, downward movement (flex) of at least a portion of the front portions 162, 164 of the support legs 158, 160. The downward flex of the front portions 162, 164 of the support legs 158, 160 may simulate a similar flex of an outdoor bicycle as the rider's weight is transferred toward and more over the front wheel of the bicycle, particularly during sprinting in the drops or aerodynamic body positioning. A similar rearward flex may occur in the rear portions 172, 174 of the support legs 158, 160 as the rider of the stationary bicycle 100 transfer her weight towards the rear of the stationary bicycle 100. The flexing of the support legs 158, 160 may include a counteracting upward force similar to a leaf spring mechanism. In other words, as the downward force is increased on the support legs 158, 160 from the shift of the rider's weight, the support legs 158, 160 may supply a counteracting upward to maintain the stationary bicycle 100 in an upright position while providing some give in any of the forward/backward or side-to-side directions, further simulating the feel of riding an outdoor bicycle that is not available through a rigid-frame stationary bicycle design.

In some instances, the stationary bicycle 100 may include a sensor to detect the forward/backward tilting and side-to-side movement of the bicycle to alter a training program displayed to a rider of the bicycle. For example, a tube sensor may be located within the center post 102 that detects the pressure against the tube sensor by an inner wall of the center post 102 in any direction. In another example, an accelerometer may be included on the stationary bicycle 100 (such as included in a top tube computing device or included in the drive control circuit 132, among other locations) to detect the movement of the bicycle and a gyroscope device may be included to detect the position of the bicycle in three dimensions. In one example, an accelerometer sensor (or other position/movement sensor) may be located at or near the handlebar stem 216 or head tube 217. The output from such a sensor may be utilized to alter or otherwise interact with a simulation program associated with the stationary bicycle 100. For example, a simulation program may illustrate an avatar of the rider of the stationary bicycle 100 through various courses and terrains. The program may be executed by one or more computing devices associated with the stationary bicycle 100 (such as an on-board computing device, a rider's mobile computing device, or a combination of on-board processing and personal computing devices) and displayed on a display within the rider's field of view. Inputs provided to the stationary bicycle 100 by the rider (such as operation of the pedals, the speed of the flywheel, the power generated by the flywheel, pressing of one or more buttons on the bicycle, a tilt or lean movement of the bicycle, etc.) may be interpreted by the computing devices and the avatar of the rider within the program may respond accordingly. For example, the tube sensor of the center post 102 may detect a rightward lean on the stationary bicycle 100 by the rider and may, in response, illustrate the avatar turning to the right within the simulation program. The sensors may also detect side to side accelerations, and alone or in combination with power readings, speed readings and the like, determine the rider is sprinting or standing and sprinting, and provide output signals concerning the same. Similar avatar movements may be executed within the program for the other types of inputs discussed above. In another example, the simulation program may not include an avatar, but may instead provide a moving scene that approximates the rider's viewpoint as if the rider was riding outdoors. Sensor and other inputs provided to the program may adjust the scenery accordingly to approximate the movement of the rider through the illustrated scenery. This may further provide the feeling of operating an outdoor bicycle outdoors while using the stationary bicycle 100.

Figure 16:
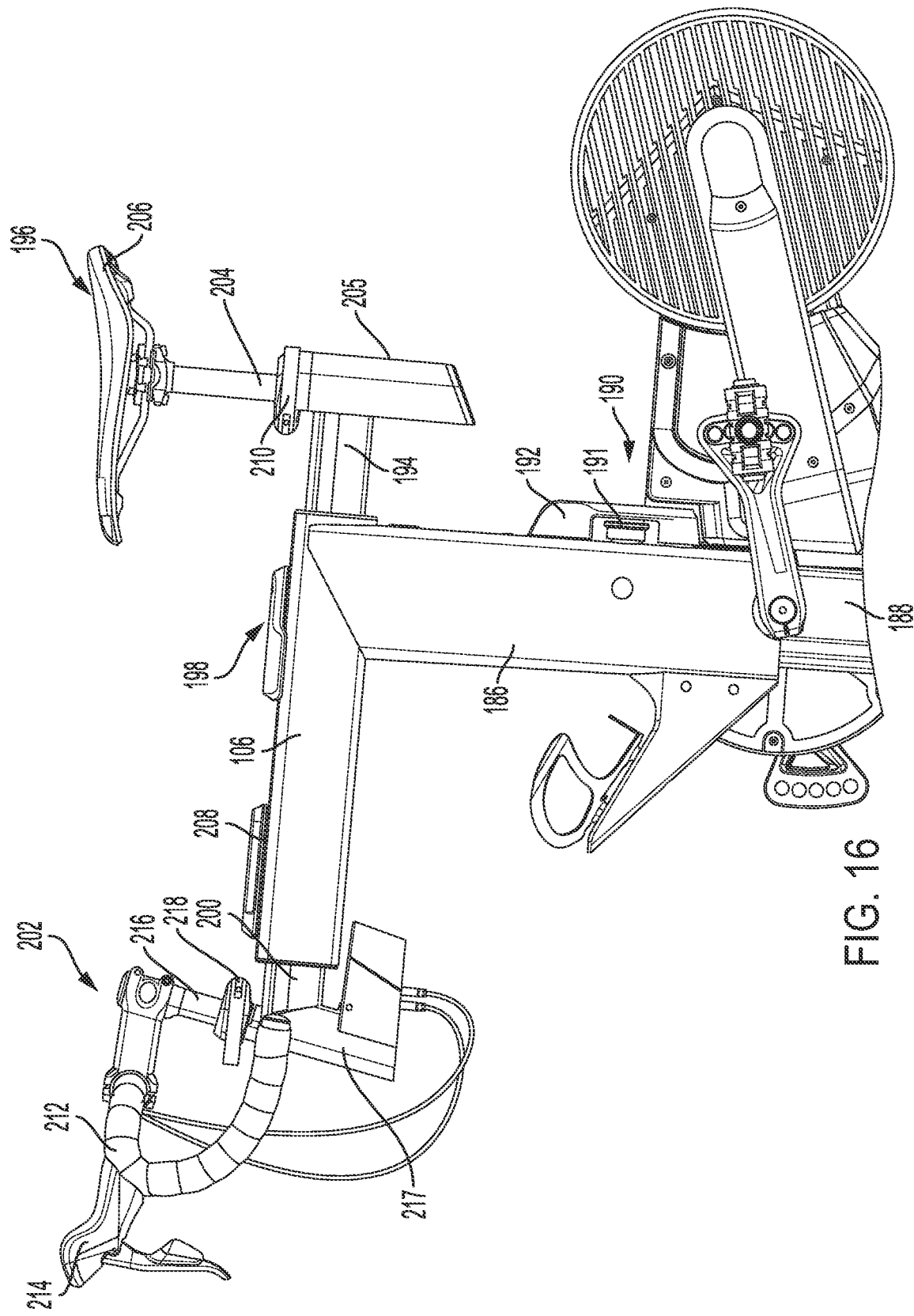
FIG. 16 is a side view of a stationary bicycle training device illustrating a various adjustment mechanisms to alter the dimensions of the bicycle device in accordance with one embodiment.
Figure 17:
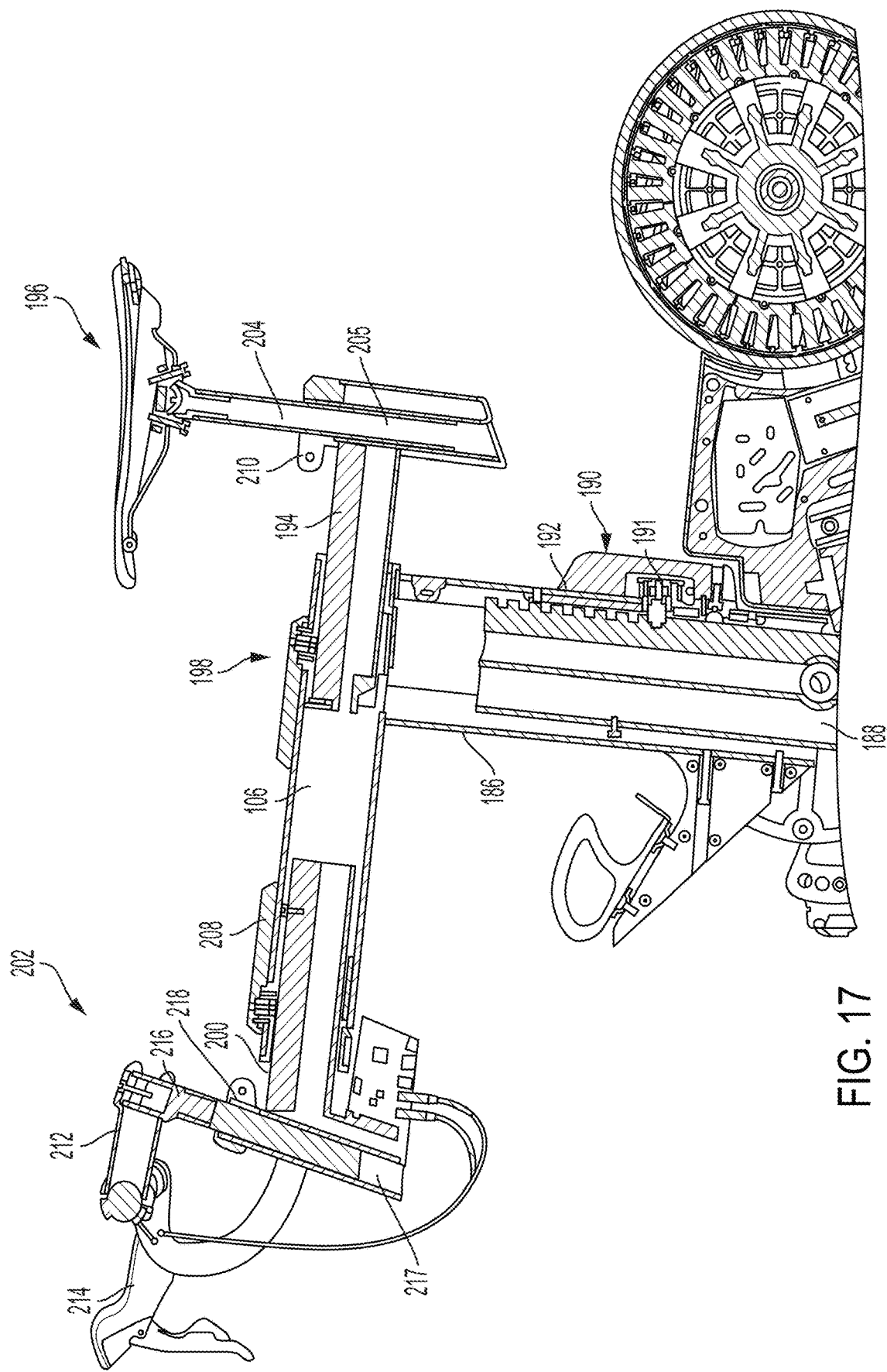
FIG. 17 is a cross-section view of the stationary bicycle training device illustrating a various adjustment mechanisms to alter the dimensions of the bicycle device in accordance with one embodiment.

As mentioned above, the stationary bicycle 100 may include several points or mechanisms to adjust one or more configurable dimensions of the stationary bicycle for different types and shapes of riders or to adjust the indoor bicycle 100 to user preferences. For example, the center post 102 of the stationary bicycle 100 may be adjustable to alter the length of the center post 102 and thereby the stack height of the stationary bicycle 100 (e.g., the distance from the center of the drive sprocket 118 to the center of the head tube 217). To adjust the length of the center post 102 and as shown in FIGS. 16-17, the center post 102 may include a hollow outer sleeve 186 that is located around an inner post 188. The outer sleeve 186 may be adjusted vertically along the inner post 188 and locked into position by a center post locking mechanism 190. The center post locking mechanism 190, in some instances, may include a locking pin 191 that engages one or more positioning slots along the inner post 188, although other locking mechanisms to lock the center outer sleeve 186 at a selected height along the inner post 188 may be utilized. To adjust the height of the center post 102, a user of the stationary bicycle 100 may disengage the center post locking mechanism 190 by pulling the locking pin 191 rearward, allowing the outer sleeve 186 to slide vertically along the inner post 188. When a desired center post 102 height is located, the locking pin 191 may be moved forward to engage one or more of the positioning slots along the inner post 188 to hold the outer sleeve 186 at the selected position. In some implementations, a locking mechanism safety arm 192 may be rotatably attached to the outer sleeve 186 that rotates in one direction to allow access to the locking pin 191 and back to block removal of the locking pin 191 while the stationary bicycle 100 is in use.

In addition to adjustment to height of the center post 102, the length of the top tube 106 may also be adjusted through two adjustment mechanisms similar to the center post adjustment mechanism. In particular, a rearward horizontally adjustable arm 194 may extend from the rearward end of the top tube 106 to adjust a distance from the rearward end of the top tube 106 to a seat assembly 196 attached to the rearward end of the adjustable arm 194. This degree of adjustment freedom allows the user body position, relative to the crank axle, handlebars, etc., to be tailored to the individual rider. In some implementations, the distance from the rearward end of the top tube 106 to a seat assembly 196 may be adjusted in a similar manner as the height of the center post 102. For example, the rearward horizontally adjustable arm 194 may include a triangular-shaped cross-section and may be located partially within the top tube 106. A rearward adjustable arm locking mechanism 198 may be included on a top surface of the top tube 106 that includes a rotatable locking mechanism that engages with a top surface of the rearward horizontally adjustable arm 194 to hold the arm in place at the desired extension length. The seat assembly 196 may be connected to the rearward horizontally adjustable arm 194 at a distal end of the arm from the top tube 106 such that horizontal adjustment of the rearward horizontally adjustable arm 194 increases a distance of the seat from the top tube 106 end. A rider may thus adjust the distance of the seat assembly 196 from the top tube 106 by disengaging the rearward adjustable arm locking mechanism 198, sliding the rearward horizontally adjustable arm 194 into or out of the top tube 106, and re-engaging the rearward adjustable arm locking mechanism 198 at the desired distance. In addition, adjustment of the rearward horizontally adjustable arm 194 may increase or decrease the seat angle (e.g., the angle from center of the drive sprocket 118 to the center of the seat assembly 196) for the rider. Providing a frame without a down tube, as would be present in many conventional outdoor and exercise bikes where the down tube, conventional rigid seat tube and conventional rigid top tube collectively provide a rigid triangle, the indoor bicycle described herein allows for both adjustment of the center post height (length) and the top tube length as there is not a structural member, like a down tube, fixing the lengths of the center post and the top tube, and the geometry of the frame itself.

In addition, the seat assembly 196 may include a seat height adjustment mechanism to adjust the height of the seat 206. In particular, the seat assembly 196 may include a seat post 204 extending from a seat tube 205 attached to a rearward end of the rearward horizontally adjustable arm 194. The seat post 204 may extend partially vertically between seat tube 205 and the bike seat 206 and the height or length of the seat post 204 that extends above the seat tube 205 may be adjusted through a seat locking mechanism 210. The seat itself may also be adjusted fore and aft relative to the top of the seat post using a rail and clamp mechanism.

A forward horizontally adjustable arm 200 may also extend from the front end of the top tube 106 to adjust a distance from the front end of the top tube 106 to a handlebar assembly 202 attached to the front end of the adjustable arm 200. Changes to the length from the top tube 106 to the handlebar assembly 202 may be adjusted in a similar manner as described above. In particular, the forward horizontally adjustable arm 200 may include a triangular-shaped bar located within a front opening of the top tube 106. A forward adjustable arm locking mechanism 208 may be included on the top surface of the top tube 106 that includes a rotatable locking mechanism that engages with a top surface of the forward horizontally adjustable arm 200 to hold or lock the arm in place at the desired extension length. A handlebar assembly 202 may be connected to the forward horizontally adjustable arm 200 at a distal end of the arm from the top tube 106 such that adjustment of the forward horizontally adjustable arm 200 increases a distance of the handlebar assembly 202 from the top tube 106 end. The handlebar assembly 202 may include handlebars 212, brake and shifter controllers 214 (discussed in more detail below), a handlebar post 216, and a head tube 217. The handlebar post 216 may extend partially vertically between head tube 217 and the handlebars 212 and may be adjustable to vary the height of the handlebars 212. In particular, the height or length of the handlebar post 216 that extends above the head tube 217 may be adjusted through a handlebar locking mechanism 218. A rider or user of the stationary bicycle 100 may adjust the distance of the handlebar assembly 202 from the top tube 106 (and the center post 102 and seat assembly 196) by disengaging the forward adjustable arm locking mechanism 208, sliding the forward horizontally adjustable arm 200 into or out of the top tube 106, and re-engaging the rearward adjustable arm locking mechanism 208 at the desired distance.

Figure 18:
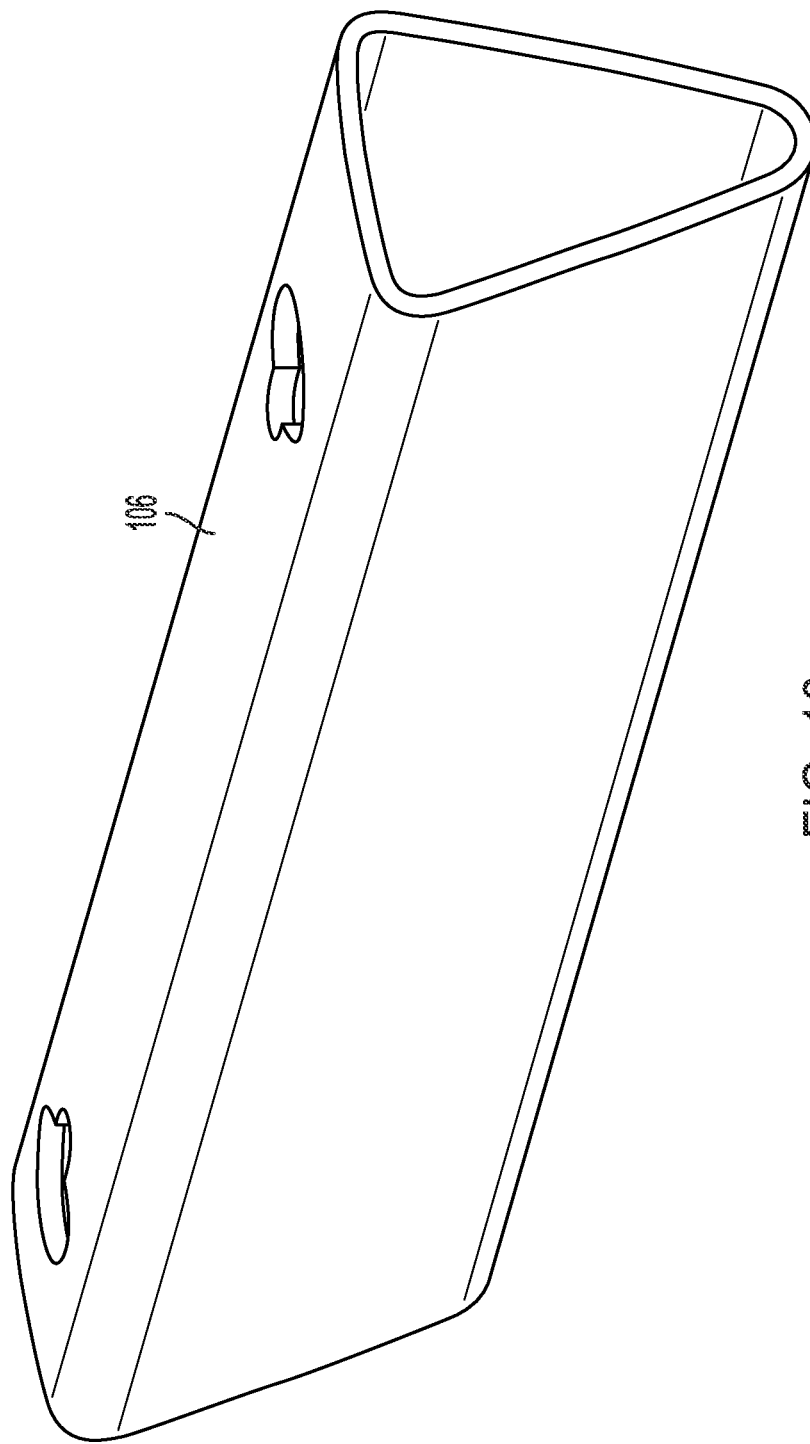
FIG. 18 illustrates a cross-section view of the top tube of the stationary bicycle in accordance with one embodiment.

The general shape of the top tube 106 (and subsequently, the forward horizontally adjustable arm 200 and the rearward horizontally adjustable arm 194 that are at least partially inserted into the top tube 106 may provide for some additional side-to-side flexibility in the stationary bicycle 100. For example, FIG. 18 illustrates a cross-section view of the top tube 106 of the stationary bicycle 100. As shown, the top tube 106 is generally hollow and includes an inverted triangle cross-section shape, with the base of the triangle along the top of the top tube 106, and the respective side walls being longer than the top wall (defining an isosceles cross section). Similar to the support legs 158, 160, the top tube 106 (along with other components of the stationary bicycle 100) may be constructed from semi-rigid materials that provide some bending when a sufficient force is applied to the material. In one example, such a material may include aluminum. The inverted triangle shape of top tube 106, with the apex pointed downward and the long walls on the sides, provides for some side-to-side flexing of the tube 106 as a rider applies a side-to-side force on the handlebar assembly 202 (or other portions of the stationary bicycle 100). Forward or rearward flexing, however, of the top tube 106 may be limited by the inverted triangle shape of the top tube 106. Similar flexible features may be included in the forward horizontally adjustable arm 200 and/or the rearward horizontally adjustable arm 194. The general flexibility of the frame components of the stationary bicycle 100 may simulate the feeling of the motion of an outdoor bicycle during use, much differently than conventional rigid-frame stationary bicycles. The triangular shapes also allow the inner tube member to wedge into the outer tube member when the length of the top tube is set thereby providing for little or no gaps between the inner and outer tube sidewalls such as could be experienced if square tubes were used.

Figure 19:
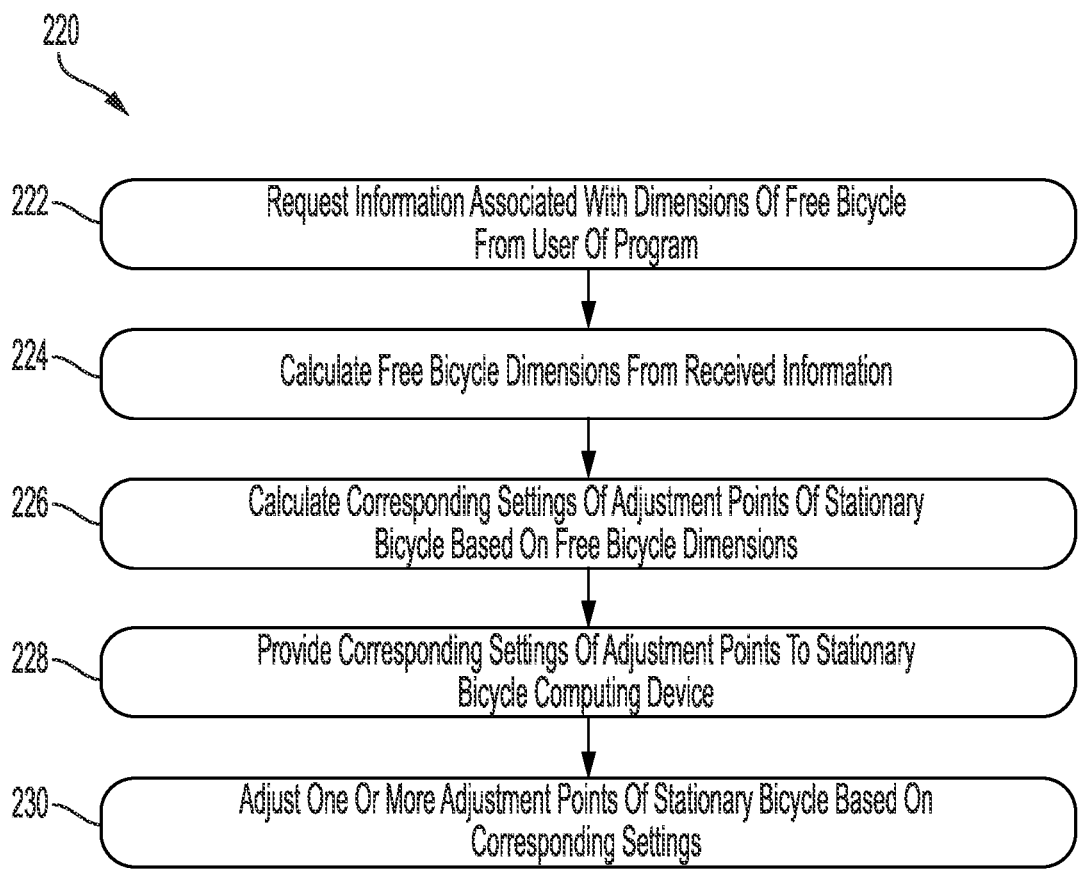
FIG. 19 is a flowchart illustrating a method for automatic adjustment of the adjustment mechanisms of the stationary bicycle training device in accordance with one embodiment.

Through the adjustments mechanisms described above, the stationary bicycle 100 provides for vertical adjustment of the center post 102, the seat post 204, and the handlebar post 216 and horizontal adjustment of forward horizontally adjustable arm 200 and the rearward horizontally adjustable arm 194, in addition to other adjustment mechanisms (such as handlebar stem length, seat position, etc.). These multiple dimensions of adjustment of the stationary bicycle 100 allow the bicycle to be adjusted or customized to many types, sizes, and shapes of various riders of the stationary bicycle 100. In some instances, the dimensions of the stationary bicycle 100 may be selected to approximate the dimensions and/or feel of the rider's outdoor bicycle. Further, the various settings or adjustments made to the adjustment mechanisms of the stationary bicycle 100 may be provided to a user through a program or application. The adjustment program may, in some instances, be configured to determine approximate dimensions of the user's outdoor bicycle via inputs provided by the user or via analysis of one or more digital images of the user's outdoor bicycle and import those dimensions to the adjustment mechanisms of the stationary bicycle 100 to match the user's outdoor bicycle dimensions. For example, FIG. 19 is a method 220 for the stationary bicycle 100 to receive dimension and/or size information or data associated with a user's outdoor bicycle and adjust one or more adjustment mechanisms of the stationary bicycle 100 according to the received dimensions. In one example, a user may download or otherwise obtain a computer program or application on a mobile computing device associated with the user and execute the program on the mobile device. The computing device, through execution of the program, may perform one or more of the operations of the method 220 to adjust the dimensions of the stationary bicycle 100 according to the dimensions of a user's or other outdoor bicycle. The mobile computing device may include, but is not limited to, a laptop computer, a gaming console, tablet device, cellular telephone, personal assistant device, or any other computing device which can receive and execute an application, receive and send wireless signals via Bluetooth™, WiFi, cellular signal, and the like.

The computing device may, in operation 222, provide instructions on a display device associated with the computing or mobile device to guide the user to obtain the general dimensions of the user's outdoor bicycle. Such instructions may include requesting the user measure and input (through an input device associated with the mobile device) various dimensions of the outdoor bicycle, such as frame stack height (the vertical distance from the center of the gear to the center of the head tube), the handlebar reach (the horizontal distance from the crank shaft to the end of the center of handlebar stem), the frame reach (the horizontal distance from the crank shaft to the center of the head tube), the seat height (the vertical distance from the crank shaft to the center of the seat), the seat tube angle (the angle of the seat tube from a vertical line from the crank shaft), and the like. In general, any dimensions may be requested from the user via the instructions displayed on the mobile device. In another embodiment, the computing device may instruct the user to take several digital images of the user's outdoor bicycle while centering the image at particular locations on the bicycle or near the bicycle. For example, the computing device may instruct the user to center a camera at the center of the chain ring of the user's outdoor bicycle and take a digital image of the bicycle. Additional digital images may also be taken of the bicycle centered at various other points on or around the bicycle for analysis by the program. In yet another example, a user may obtain a digital image of the bicycle and select, within the image, contact points that define the dimensions of the imaged bicycle. Further, the user may provide one or more body dimensions, such as the user's height, inseam, ride position, etc.

In operation 224, the computing device may calculate one or more of the above dimensions of the outdoor bicycle through the received input data or through an analysis of the digital images taken by the user with the mobile device. In one instance, the program may analyze each digital image to determine landmarks on the user's outdoor bicycle (such as the center of the chain ring, the center of the head tube, etc.) and estimate a distance between the determined landmarks. Through a digital image analysis of the images, the computing device may therefore calculate or estimate the various dimensions of the user's outdoor bicycle for adjustment of the stationary bicycle 100.

In operation 226, the computing device may calculate one or more corresponding settings or adjustments to the adjustment mechanisms of the stationary bicycle 100 to approximate the dimensions of the outdoor bicycle. For example, the computing device may calculate the stack height of the user's outdoor bicycle from the provided information or data. A particular setting of the center post 102 adjustment mechanism may approximate the same or similar stack height as the calculated stack height of the user's outdoor bicycle such that adjustment of the center post 102 to that setting may approximate the stack height of the user's outdoor bicycle. Other adjustment mechanisms of the stationary bicycle 100 may also include settings corresponding to the received dimensions, such as settings in the forward horizontally adjustable arm 200 to approximate the calculated handlebar reach, settings in the seat stem 204 to approximate the seat height, settings in the rearward horizontal adjustment arm 194 to approximate the seat tube angle, and the like. In some instances, the calculated settings may include a combination of adjustments to the various adjustments mechanisms of the stationary bicycle 100 to approximate the dimensions of the outdoor bicycle. For example, the seat height of the outdoor bicycle may be approximated through adjustments to both the seat stem 204 and/or the center post 102. One or more determined settings may thus account for other determined settings to maintain appearance of the stationary bicycle 100, stability of the stationary bicycle 100, and/or overall performance of the stationary bicycle 100. Further, as the stationary bicycle 100 includes multiple adjustment mechanisms, fine tuning of the dimensions of the bicycle may be achieved. For example, in addition to simply increasing the length of the top tube, the adjustment mechanism to move both the seat assembly and the handlebar assembly forward and rearward provides for the adjustment to the multiple angles between the crank axle and the seat position, handlebar position, etc. Thus, the multiple adjustment mechanisms provides for a more configurable bicycle design than previous stationary bicycle designs.

Because the stationary bicycle 100 includes multiple adjustment mechanisms that each can be adjusted to alter the riding dimensions of the device, the computing device may apply additional constraints or considerations when calculating the settings of the adjustment mechanisms of the bicycle such that one adjustment may be favored over another. For example, the computing device may attempt to maintain a center post 102 height below a threshold height to ensure stability within the stationary bicycle 100. Other threshold limits for the other adjustment mechanisms for the stationary bicycle 100 may also be utilized such that no setting exceeds the corresponding threshold limit. In some instances, the targeted dimensions may not be available through the adjustment mechanisms of the indoor bicycle 100. In such instances, preferences to some adjustment mechanisms over others may be considered by the computing device based on stability calculations, aesthetic concerns, considerations of the rider's dimensions, and the like. For example, a seat height adjustment may be preferred by the computing device over a handlebar length or other adjustable dimensions. Another consideration of the computing device may be to minimize the total error or displacement from the target dimensions across all or some of the adjustments such that the corresponding settings of the adjustment mechanisms considers the error in all adjustment mechanisms. Any error in displacement between the targeted stationary bicycle 100 dimensions and the achieved dimensions of the stationary bicycle 100 may be provided to a user of the bicycle, in some instances, such as through the display of the computing device.

In some instances, the settings of the adjustment mechanisms of the stationary bicycle 100 may be provided on a display associated with the computing device so that the user may manually adjust the stationary bicycle 100 accordingly. For example, a calculated center post 102 setting may be provided to the user for manual adjustment of the center post 102. One or more indicators of the different adjustment settings may be printed on the adjustment mechanisms or the indoor bicycle 100 or otherwise provided to the user for quick adjusting of the various adjustment mechanisms. In other instances, the determined corresponding settings of the adjustment mechanisms of the stationary bicycle 100 may be transmitted or otherwise provided to a control portion or circuit of the stationary bicycle 100 for automatic adjustment of the dimensions of the stationary bicycle according to the determined settings in operation 228. For example, a user mobile device may wirelessly transmit one or more of the corresponding settings of the stationary bicycle 100 adjustment mechanisms to a control circuit on or otherwise connected to with the indoor bicycle 100. The stationary bicycle 100 control circuit may, in response to receiving the corresponding settings, generate and transmit one or more control signals to one or more motors associated with the adjustment mechanisms of the stationary bicycle 100 to apply the corresponding settings in operation 230. For example, based on a center post 102 setting received from the mobile device, a center post adjustment motor may be activated to vertically move the center post outer sleeve 186 along the inner post 188 to a position indicated by the center post setting to approximate one or more dimensions of the user's outdoor bicycle. Other adjustment mechanisms of the stationary bicycle 100 may also be associated with or include adjustment motors to automatically adjust the dimensions of the stationary bicycle 100 according to the corresponding settings received from the mobile device. In this manner, the stationary bicycle 100 may be automatically adjusted based on the calculated corresponding settings of the adjustment mechanisms determined by the computing device.

Further, the control circuit of the stationary bicycle 100 may include one or more storage devices to store the settings for one or more riders or users of the stationary bicycle 100. For example, a first rider may have a first set of adjustment settings that correspond to the first rider's preferences or dimensions of the first rider's outdoor bicycle. These settings may be stored in a storage device and associated with the first rider's identity as a first rider profile. When an indication of the first rider is provided to the control circuit (such as through an input device associated with the bicycle 100 or through a mobile device carried by the rider), the stationary bicycle 100 may adjust the bicycle to the stored settings such that the stationary bicycle 100 conforms to the first rider's preferences. In one example, the indication of the first rider provided to the stationary bicycle may include an identification signal transmitted to the control circuit from a mobile device carried by or otherwise associated with the first rider. In a similar manner, a second rider's settings may also be stored in the storage device of the control circuit for adjustment of the stationary bicycle to conform to the second rider's preferences when an indication of the second rider is provided to the control circuit of the bicycle. Further, more than one setting profile may be associated with a user, such as when the user has two or more outdoor bicycles. The user may select from the multiple stored profiles as desired based on which of the outdoor bicycles the user prefers the stationary bicycle 100 to approximate. In general, any number of settings profiles for any number of riders of the stationary bicycle may be stored and used to adjust the dimensions of the bicycle.

Figure 20:
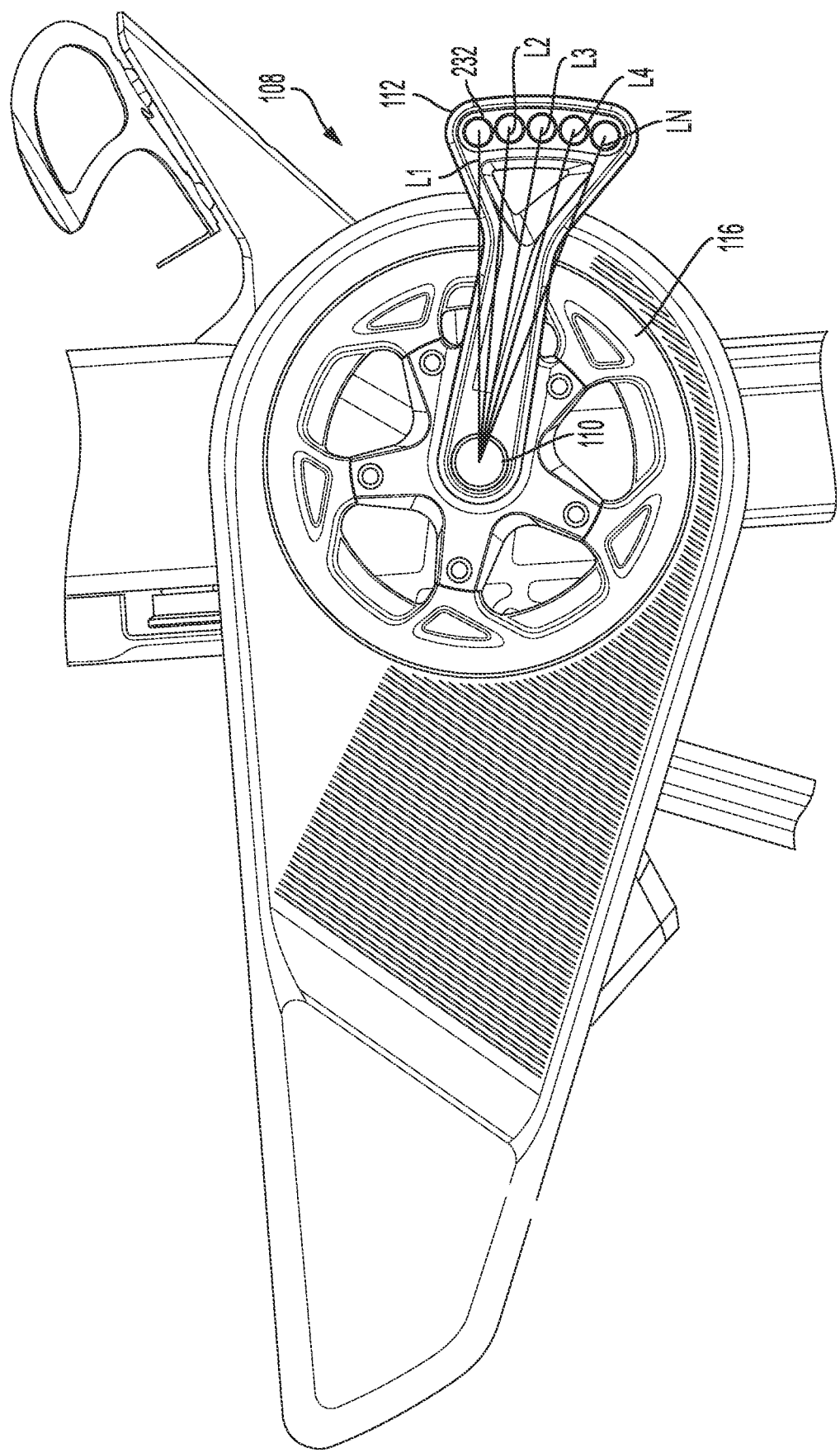
FIG. 20 is a side view of a stationary bicycle training device illustrating an adjustable crank arm in accordance with one embodiment.

Additional features of the stationary bicycle 100 provide still more advantages over previous stationary bicycle designs. For example, stationary bicycle 100 may include an adjustable crank arm 112 that provides for adjusting a crank length, as illustrated in FIG. 20. The crank arm 112 may have a generally triangular hammer head shape and be connected to the crank shaft 110 on a first end such that the entire crank arm 112 is rotatable about the crank shaft. A plurality of threaded holes 232 may be located extending through the crank arm 112 on the end of the crank arm 112 distal to the end of the crank arm 112 connected to the crank shaft 110. The threaded holes 232 through the crank arm 112 may be disposed in an arcuate arrangement along the end of the crank arm 112. The threads of each crank arm hole 232 may engage corresponding threads on a mounting rod of a pedal 120 such that the pedal screwed onto or otherwise connected to the crank arm 112 at any of the crank arm hole 232 positions. By threadably engaging a pedal 120 with one of the plurality of threaded holes 232 of the crank arm 112, the crank length (or the length from the center of the crank shaft 110 to the center of the pedal 120) may be adjusted as desired by a rider of the stationary bicycle 100. For example, the length L1 from the center of the crank shaft 110 to the center of a first hole may be shorter than a L2 from the center of the crank shaft 110 to the center of a second hole of the crank arm. The crank arm 112 may include multiple such lengths such that, by selecting to insert the pedal 120 into one of the holes, a user of the stationary bicycle 100 may select the desired length (L1 through LN) for the rider's fit. The adjustment of the crank length further customizes the stationary bicycle 100 to a rider's preferences or dimensions.

Figure 21:
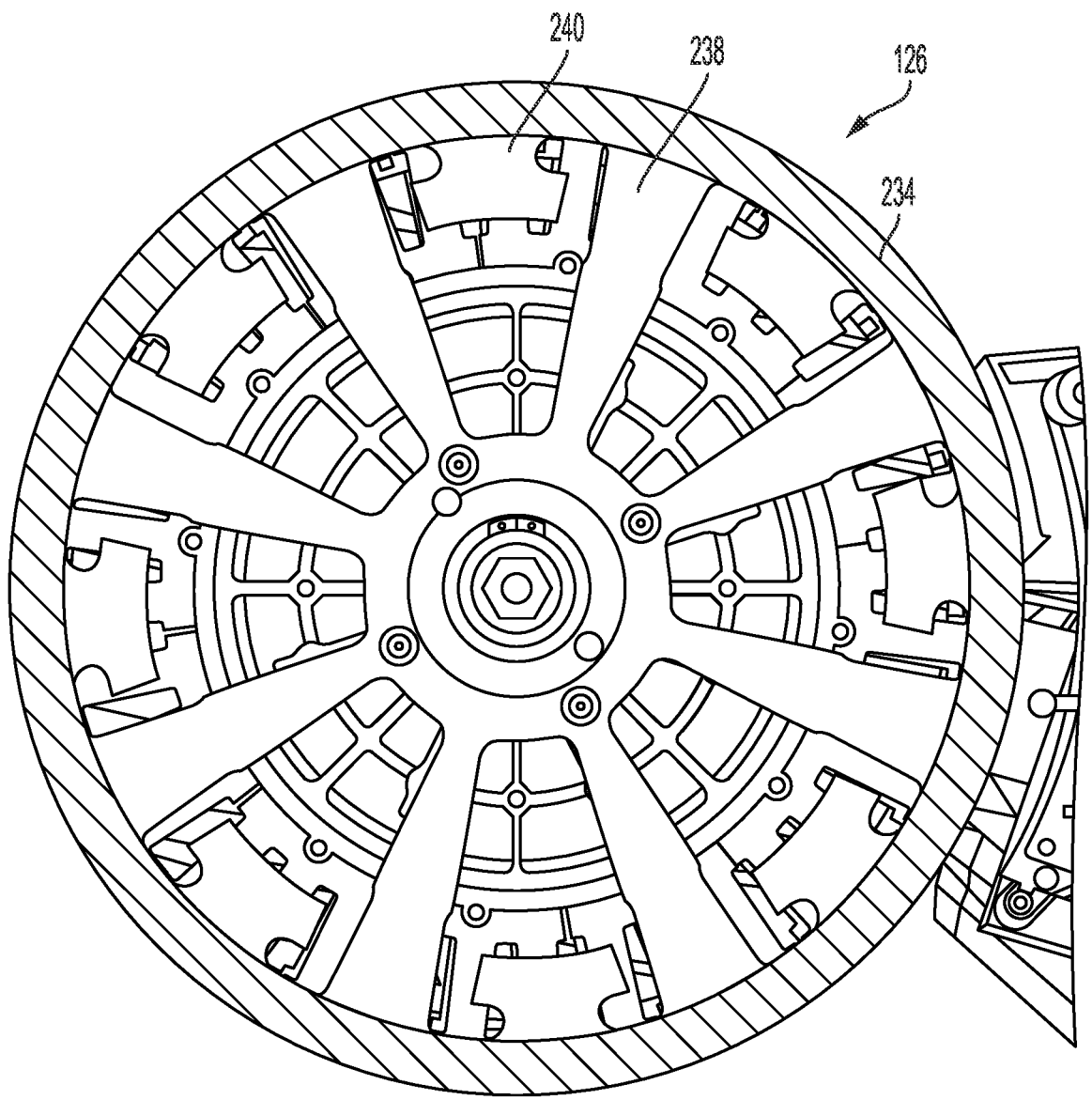
FIG. 21 is a cross-section view of a flywheel/motor assembly of the stationary bicycle training device illustrating the flywheel member of the assembly in accordance with one embodiment.
Figure 22:
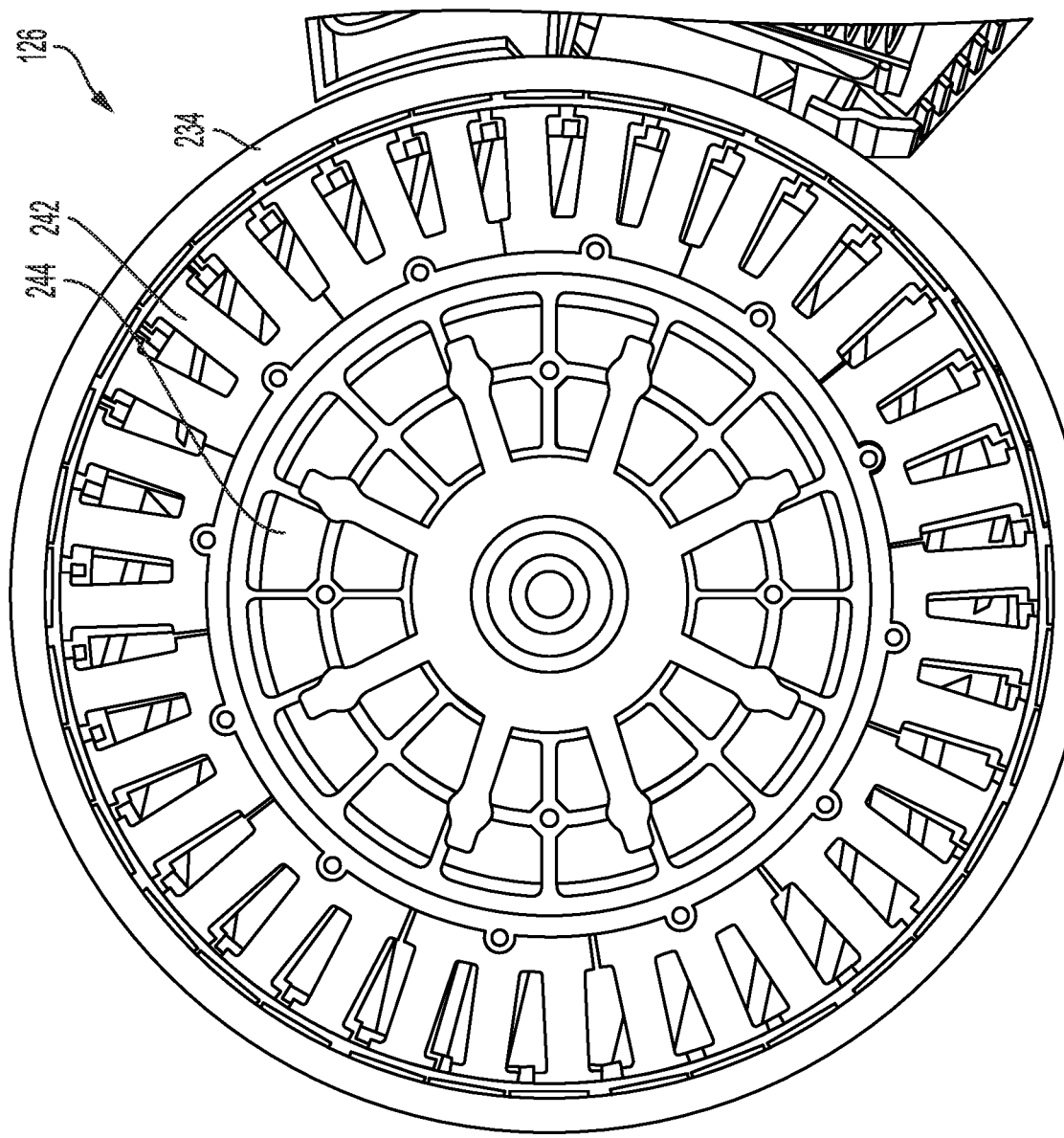
FIG. 22 is a cross-section view of a flywheel/motor assembly of the stationary bicycle training device illustrating the motor portion of the assembly in accordance with one embodiment.
Figure 23:
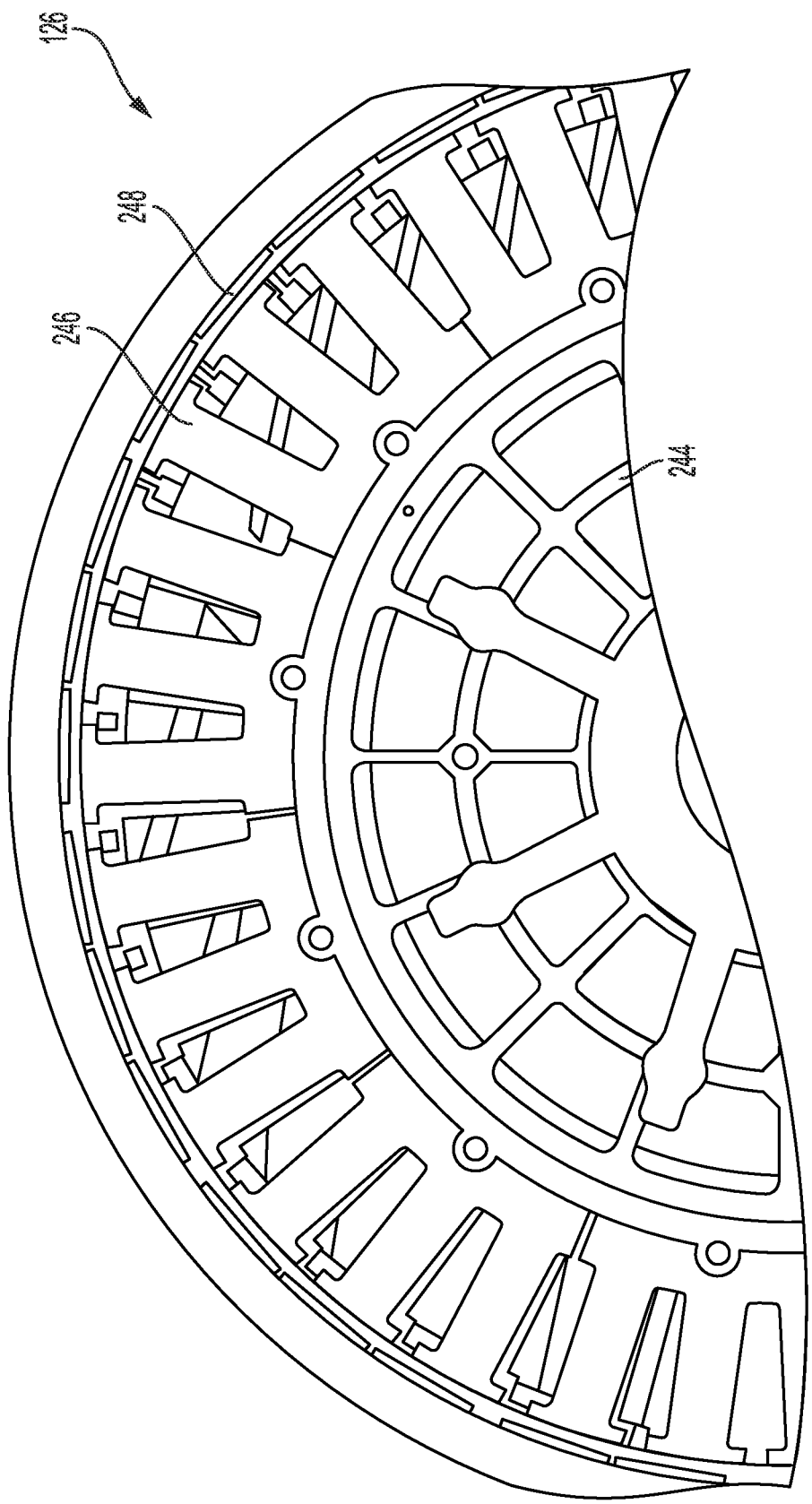
FIG. 23 is a close-up view of the cross-section view of a flywheel/motor assembly of the stationary bicycle training device illustrating the motor portion of the assembly in accordance with one embodiment.

Turning now to FIGS. 21-23, the stationary bicycle 100 may also include a flywheel/motor assembly 126 comprising an outer, relatively heavy, flywheel member 234 configured to rotate relative to a plurality of internal components that are substantially fixed relative to the outer rotatably flywheel member 234. The flywheel member 234 is coupled with a flywheel axle 236 (depicted in FIG. 3) that communicates through an inner portion of the flywheel/motor assembly 126. The flywheel axle 236 is connected to the rear gear 124 discussed above such that a user's pedaling force is translated through the belt 118 from drive sprocket 116 to the rear gear 124 and flywheel axle 234, which in turn causes the flywheel member 234 to rotate. The flywheel member 234 includes one or more spokes 238 extending from a center portion of the flywheel member to an outer portion of the flywheel member 234 to add structural support to the flywheel member 234. In one example, eight spokes are present on the flywheel member 234. One or more balance structures 240 may be disposed on the outer portion of the flywheel member 234, extending toward the center portion of the flywheel member 234 to provide a weighted balance to the flywheel member 234 and reduce or minimize vibration of the member during rotation. In one example, the balance structures 240 may be T-shaped and the flywheel member 234 may include eight such structures evenly disposed around the inner circumference of the outer portion of the flywheel member 234.

The fixed internal components of the flywheel/motor assembly 126 may include an electromagnetic motor assembly including a plurality of electromagnetic members 242 supported on a core plate 244 to provide a magnetic motor or brake force to the flywheel member 234. In some arrangements, the motor assembly may be computer controlled to dynamically adjust or apply a rotation force and/or braking force to the flywheel member 234 to simulate different riding experiences. In the illustrated example, the core plate 244 defines a circular plate upon which the plurality of electromagnetic members 242 extend radially from the core plate. In one embodiment, the motor assembly may be a three-phase motor that includes 36 electromagnetic members 242 equally disposed around the circumference of the core plate 244. The electromagnetic members 242 may include a bobbin or I-shaped portion 246 around which a conductor, such as copper wiring, is wound. The conductor may wind around a neck of the I-shaped portions 246, between the upper portion of the I and the lower portion of the I. The wire may be continuous so that a consistent current flows around each electromagnetic member 242 and a consistent electromagnetic force is generated uniformly around the core plate 244. Collectively, the electromagnetic members 242 and wound wiring can generate a magnetic field that magnetically couples with the flywheel member 234. In particular, an inner surface of the flywheel member 234 includes a plurality of magnets 248. The magnets 248 have a generally keystone-shaped cross-section and extend partially toward the electromagnetic members 242 of the motor assembly. In one example, 38 magnets are disposed along the inner surface of the flywheel member 234. As the electromagnetic members 242 are energized, the generated magnetic field may interact with the magnetic field of the magnets 248 on the flywheel member 234. During rotation of the flywheel member 234, the generated magnetic field of the electromagnetic members 242 may oppose rotation of the flywheel member 234 or increase the rotation of the flywheel member 234, depending the direction of the flow of current through the wiring of the electromagnetic members 242. In this manner, a braking force may be applied to the magnets and flywheel member 234 or an increase in rotation of the flywheel member 234 may be applied by the motor assembly.

The relatively large number of magnets may create a more consistent magnetic field around the flywheel member as it interacts with the generated magnetic field of the motor. For example, as a magnet exits a magnetic field generated by a first electromagnetic member and enters a magnetic field generated by a first electromagnetic member (during rotation of the flywheel member 234 around the electromagnetic members 242), the interactive force between the magnetic fields may vary. Large distances between the electromagnetic members 242 may result in larger disparities in the magnetic fields interactions as the magnet transitions from one magnetic field to the next. Including more electromagnetic members 242 and magnets 248 in the flywheel/motor assembly 126 may reduce the variability in the interactions of the magnetic fields. This may induce a smoother feel to the control of the flywheel member 234 by the motor as the magnetic field around the motor is more consistent.

The control of the current transmitted through the windings to control the motor/flywheel assembly 126 may be provided by a computing device, including a processor and associated electronics, associated with the stationary bicycle 100. FIG. 23 is a block diagram illustrating an example of such a computing device or computer system 1000 which may be used in implementing the embodiments of the components of the network disclosed above. The computer system (system) includes one or more processors 1002-1006. Processors 1002-1006 may include one or more internal levels of cache (not shown) and a bus controller or bus interface unit to direct interaction with the processor bus 1012. Processor bus 1012, also known as the host bus or the front side bus, may be used to couple the processors 1002-1006 with the system interface 1014. System interface 1014 may be connected to the processor bus 1012 to interface other components of the system 1000 with the processor bus 1012. For example, system interface 1014 may include a memory controller 1014 for interfacing a main memory 1016 with the processor bus 1012. The main memory 1016 typically includes one or more memory cards and a control circuit (not shown). System interface 1014 may also include an input/output (I/O) interface 1020 to interface one or more I/O bridges or I/O devices with the processor bus 1012. One or more I/O controllers and/or I/O devices may be connected with the I/O bus 1026, such as I/O controller 1028 and I/O device 1030, as illustrated.

I/O device 1030 may also include an input device (not shown), such as an alphanumeric input device, including alphanumeric and other keys for communicating information and/or command selections to the processors 1002-1006. Another type of user input device includes cursor control, such as a mouse, a trackball, or cursor direction keys for communicating direction information and command selections to the processors 1002-1006 and for controlling cursor movement on the display device.

System 1000 may include a dynamic storage device, referred to as main memory 1016, or a random access memory (RAM) or other computer-readable devices coupled to the processor bus 1012 for storing information and instructions to be executed by the processors 1002-1006. Main memory 1016 also may be used for storing temporary variables or other intermediate information during execution of instructions by the processors 1002-1006. System 1000 may include a read only memory (ROM) and/or other static storage device coupled to the processor bus 1012 for storing static information and instructions for the processors 1002-1006. The system set forth in FIG. 10 is but one possible example of a computer system that may employ or be configured in accordance with aspects of the present disclosure.

According to one embodiment, the above techniques may be performed by computer system 1000 in response to processor 1004 executing one or more sequences of one or more instructions contained in main memory 1016. These instructions may be read into main memory 1016 from another machine-readable medium, such as a storage device. Execution of the sequences of instructions contained in main memory 1016 may cause processors 1002-1006 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 1016, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

As described, control of the flywheel/motor assembly 126 may include varying the current provided to the electromagnetic members 242 to generate a magnetic field to interact with the magnetic field of the magnets 248 on the flywheel member 234. During rotation of the flywheel member 234, the generated magnetic field of the electromagnetic members 242 may oppose rotation of the flywheel member 234 (to apply a braking force to the flywheel) or increase the rotation of the flywheel member 234 (to apply an accelerating force to the flywheel), depending the direction of the flow of current through the wiring of the electromagnetic members 242. Further, the magnetic force applied by the electromagnetic members 242 may be directly proportional to the current flow and direction through the wiring of the electromagnetic members 242. In other words, a high current signal that flows through the wiring in a first direction may apply a high braking force on the flywheel member 234, while a high current signal that flows in the opposite direction the wiring may apply a high acceleration force on the flywheel member 234. Signals with a smaller current may apply less force onto the flywheel member 234 based on the direction of current flow. In this manner, minute control of the magnetic forces applied to the flywheel member 234 by the motor assembly may be provided by the control circuit of the stationary bicycle 100.

Figure 25A:
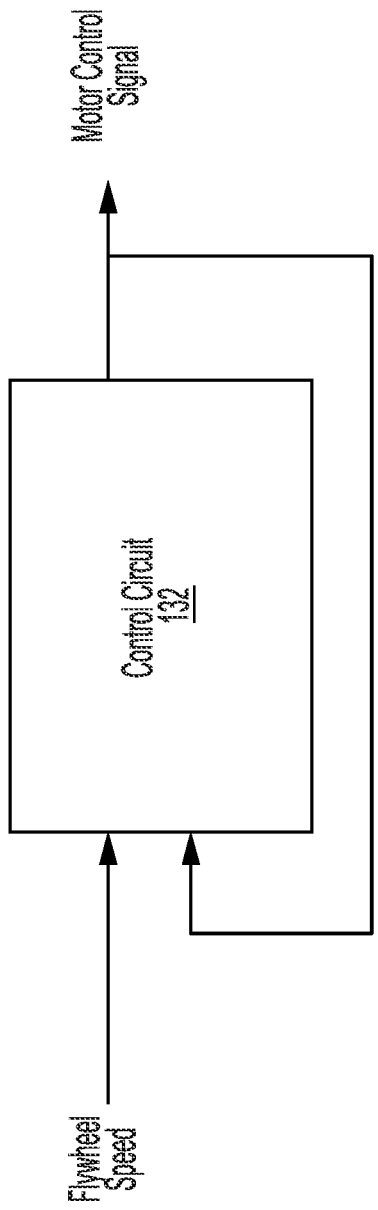
FIG. 25A is a block diagram illustrating a control circuit to control a motor of a stationary bicycle training device in accordance with one embodiment.

To determine the current flow to the motor, the control circuit 132 may execute a control algorithm to determine the current provided to the motor assembly. In some instances and as shown in FIG. 25, the control algorithm may include as an input a speed sensor or speed encoder that provides a speed and position of the flywheel member 234 with respect to a chosen axis. Typical stationary bicycle flywheel sensors, such as power meters, strain gauges, etc., may not be included with the stationary bicycle 100 to provide inputs to the control function. Rather, the speed encoder may provide the relative speed of the flywheel which the control circuit 132 may utilize to provide a motor control signal to control the current provided to the motor. The control circuit 132 may also include the output motor control signal as another input to estimate physical characteristics of the rider and/or stationary bicycle 100. For example, the control circuit 132 may utilize the output control signal to estimate the simulated speed of the rider, a torque provided by the rider to the pedals, a power generated by the flywheel member 234, and the like.

In some instances, the stationary bicycle 100 may be operated in one of many operating modes. For example, one operating mode of the stationary bicycle 100 may be an "erg" mode in which a rider of the bicycle attempts to operate the bicycle at a constant power output. In this operating mode, the control circuit 132 may control the motor (and thereby the rotational speed of the flywheel member 234 as discussed above) in response to the cadence (or the rotation of the pedal/drive sprocket assembly) of the rider to maintain a constant estimated power output of the flywheel member 234. For example, the control circuit 132 may receive as an input the speed of the flywheel member 234 rotation from the speed encoder. From the speed input, the control circuit 132 may estimate a speed of the rider's pedaling (also referred to as the rider's "cadence"), a torque provided by the rider's cadence, a power generated by the rider's cadence, and the like. Additional system estimates may also be calculated, such as a drag on the flywheel member 234 from the system and/or acceleration and deceleration components. In general, the output signal to the motor is relative to the cadence of the rider. For example, the control circuit 132 may determine a target cadence of the rider or a target power of the rider, and generate the control signals of the motor to change the rider's cadence to the target cadence or alter power the rider is using to meet the cadence. Thus, if the control circuit 132 determines that the cadence of the rider increases, the resistance on the flywheel member 234 from the motor may be increased by the control circuit 132 through the application of current through the wires of the motor. In some instances, the control of the motor based on the control signals may be delayed or applied through a ramping signal to mitigate significant change in the rotation of flywheel member 234 over a short period of time. Rather, the control over the motor may be such that smooth transitions from the rider's cadence to the target cadence are applied. For example, the motor control signal generated by the control circuit 132 may include a sinusoidal waveform that approximates a corresponding sinusoidal waveform of the torque applied by the rider to the pedals. By applying a sinusoidal waveform to the current changes in the motor control that approximates the user's cadence, the changes to the flywheel member 234 rotation may provide a smoother feel to the rider. In some instances, the frequency of the sinusoidal waveform of the control signal may be similar or the same to the frequency of the frequency of the estimated torque (or power) of the rider's input to the stationary bicycle 100.

In another operating mode, sometimes known as a simulation mode, the control circuit 132 may control the motor (and flywheel member 234) to simulate an outdoor riding environment. In such an operating mode, the control circuit 132 may include a physics model that estimates various resistances on a rider during a simulated outdoor riding experience, such as wind resistance, road grade, road resistance, and the like. The speed input from the flywheel member 234 along with resistance settings may be used to estimate the cadence of the rider, the torque, the power, etc. as described above and the control circuit 132 may utilize such estimates to control the motor to provide the simulated outdoor riding experience. For example, the control circuit 132 may simulate an uphill grade by increasing the resistance on the flywheel member 234 through control of the motor. Similarly, a downhill grade may be simulated by controlling the motor to provide an increasing rotational force on the flywheel member 234. Other effects of an outdoor riding experience may be simulated through control of the motor/flywheel assembly 126, such as wind resistance and road resistance by resisting or increasing the rotation of the flywheel member 234. For example, as the rider begins pedaling or is pedaling at what is determined or estimated to be a slow speed, the physics model may output a small wind resistance. However, as the rider's estimated speed increases, the simulated wind resistance may be increased by the physics model. As the simulated wind resistance increases, the braking force applied to the flywheel member 234 through control of the motor may be similarly be increased.

Figure 25B:
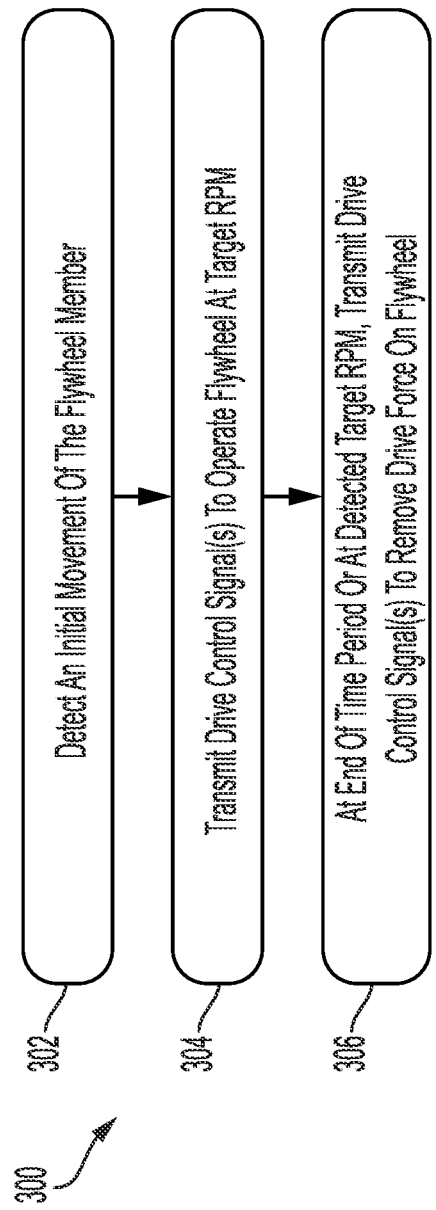
FIG. 25B is a flowchart of a method for generating a drive signal of a motor of a stationary bicycle training device to aid in initial rotation of a flywheel in accordance with one embodiment.

In some instances, the control circuit 132 may aid the rider at the beginning of the rider's use of the stationary bicycle 100. For example, when the flywheel member 234 goes from standing still to rotation, the magnets 248 may interact with the magnetic field generated from the windings around the bobbins 246 and cause a cogging or start-stop effect as each magnet passes through the magnetic field created by the windings. In addition, it may be initially difficult for a rider to overcome the magnetic attraction between the magnets 248 and the magnetic field created by the motor. In overcome these effects, the control circuit 132 may be configured to first detect the initial movement or rotation of the flywheel member 234 and generate a signal to the motor to generate a force to aid the spinning of the flywheel member 234. In particular, FIG. 25B is a flowchart of a method 300 for generating a drive signal of a motor of a stationary bicycle training device to aid in initial rotation of a flywheel in accordance with one embodiment In this method 300, the control circuit 132 may detect an initial movement of the flywheel member 234 based on activation of the drive mechanism of the stationary bicycle 100. The control circuit 132 may, in response, generate a control signal and transmit the control signal to the motor of the motor/flywheel assembly. In one particular example, the drive signal may instruct the motor to spin the flywheel member 234 at 30 rotations per minute (rpm). At the expiration of the time period or when a target rpm of the flywheel member 234 is achieved, the control circuit 132 may transmit, in operation 306, another control signal to remove the drive force on the motor/flywheel assembly and operate the motor in response to the user's cadence. The above described control of the motor in response to the cadence of the rider (and other factors) may then be executed by the control algorithm to apply the braking or aiding force on the flywheel 234.

Inputs from a rider of the stationary bicycle 100 may also be considered by the control circuit 132 executing the control algorithm. For example, the rider may provide customizable dimensions of a virtual bicycle that may alter the various calculations of the rider and/or bicycle characteristics. One such customization is a virtual wheel diameter that may be input to or otherwise set by the rider and provided to the control circuit 132 for use in calculating estimated rider speed and/or rotational speed of a virtual wheel (associated with a virtual avatar of the rider). Another customization input from the rider may include a virtual gear ratio between a front gear assembly (corresponding to chain rings connected to a crank arm of an outdoor bicycle) and a rear gear assembly (corresponding to a cog set on a rear wheel of the outdoor bicycle). However, the gears of the stationary bicycle 100 (the drive sprocket 116 and the rear gear 124) are fixed in that the ratio between the diameters of the drive sprocket 116 and the rear gear 124 are not adjustable. Rather, the rotation of the flywheel member 234 may be controlled to simulate different gear ratios. For example, the rider may select a different gear ratio (through shifter assemblies discussed in more detail below) to operate the stationary bicycle 100. The control circuit 132 may use the virtual gear ratio selection (and other considerations, such as the rider speed, flywheel member 234 speed, cadence of the rider, etc.) to determine a target cadence of the rider based on the selected virtual gear ratio. The control circuit 132 may, in turn, control the motor to adjust the rotational speed of the flywheel member 234 to apply the target cadence to the stationary bicycle 100.

Figure 26:
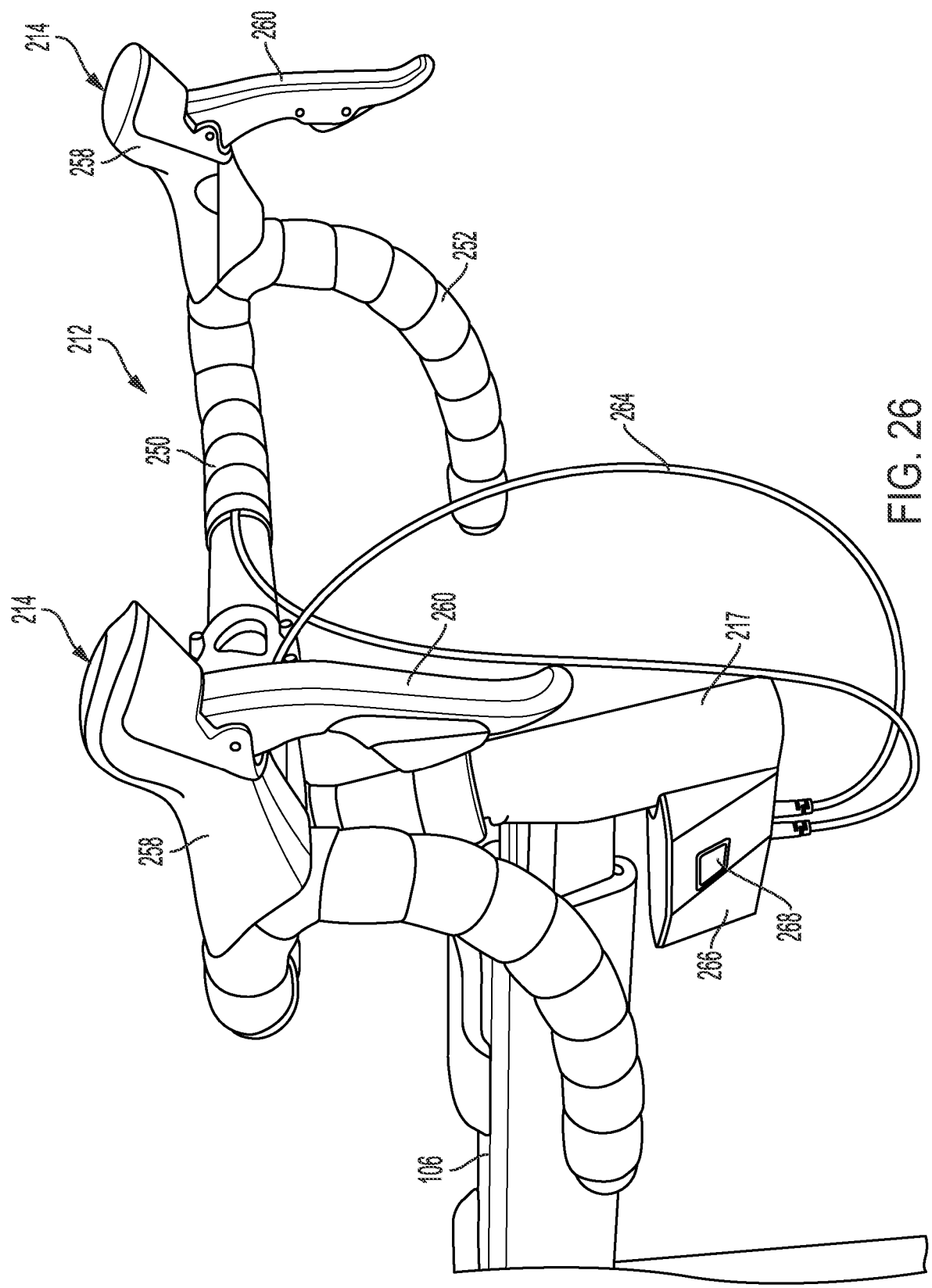
FIG. 26 is an isometric view of a handlebar assembly of a stationary bicycle training device in accordance with one embodiment.
Figure 27:
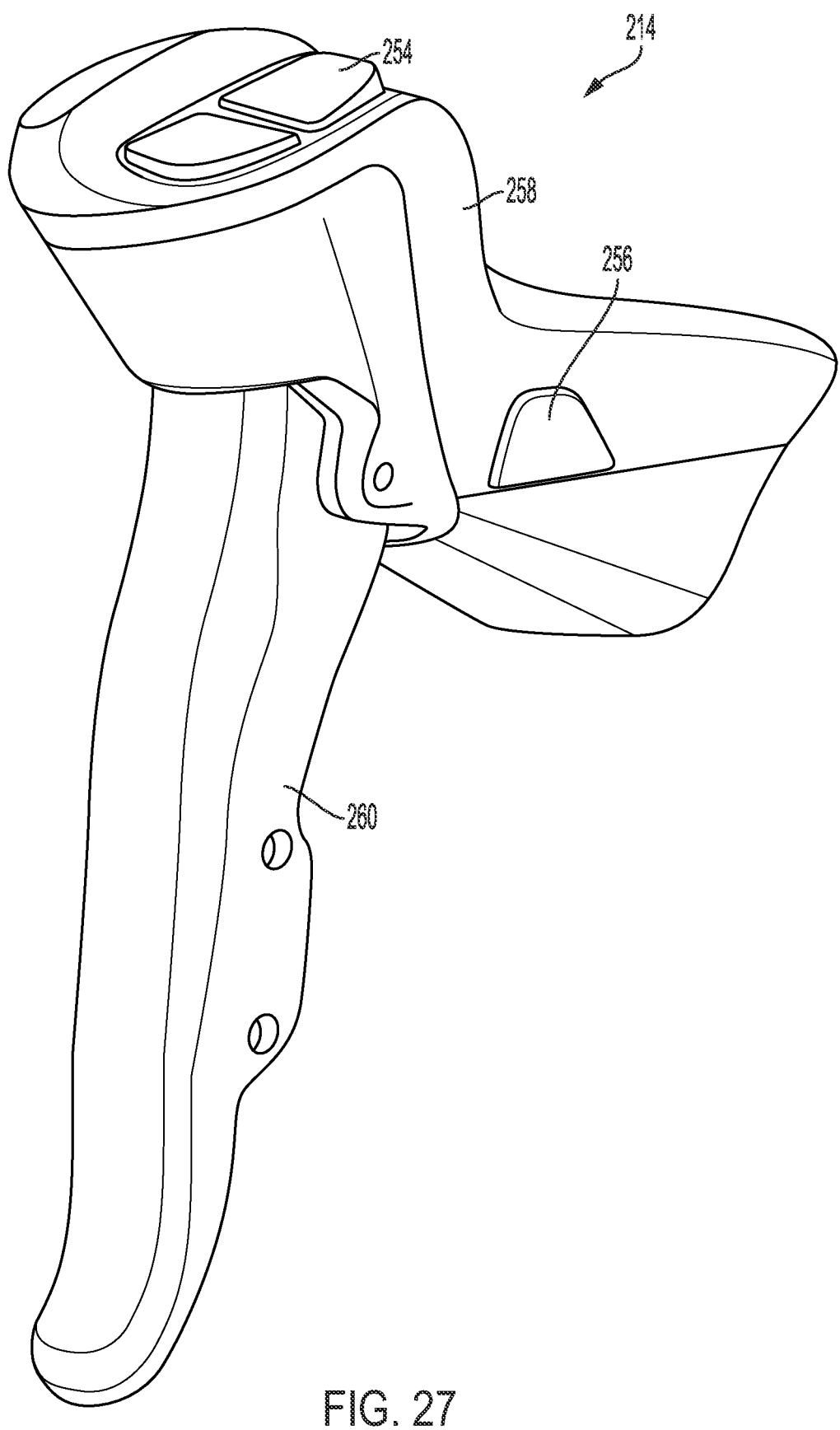
FIG. 27 is an isometric side view of a shifter/brake controller of a stationary bicycle training device in accordance with one embodiment.
Figure 28:
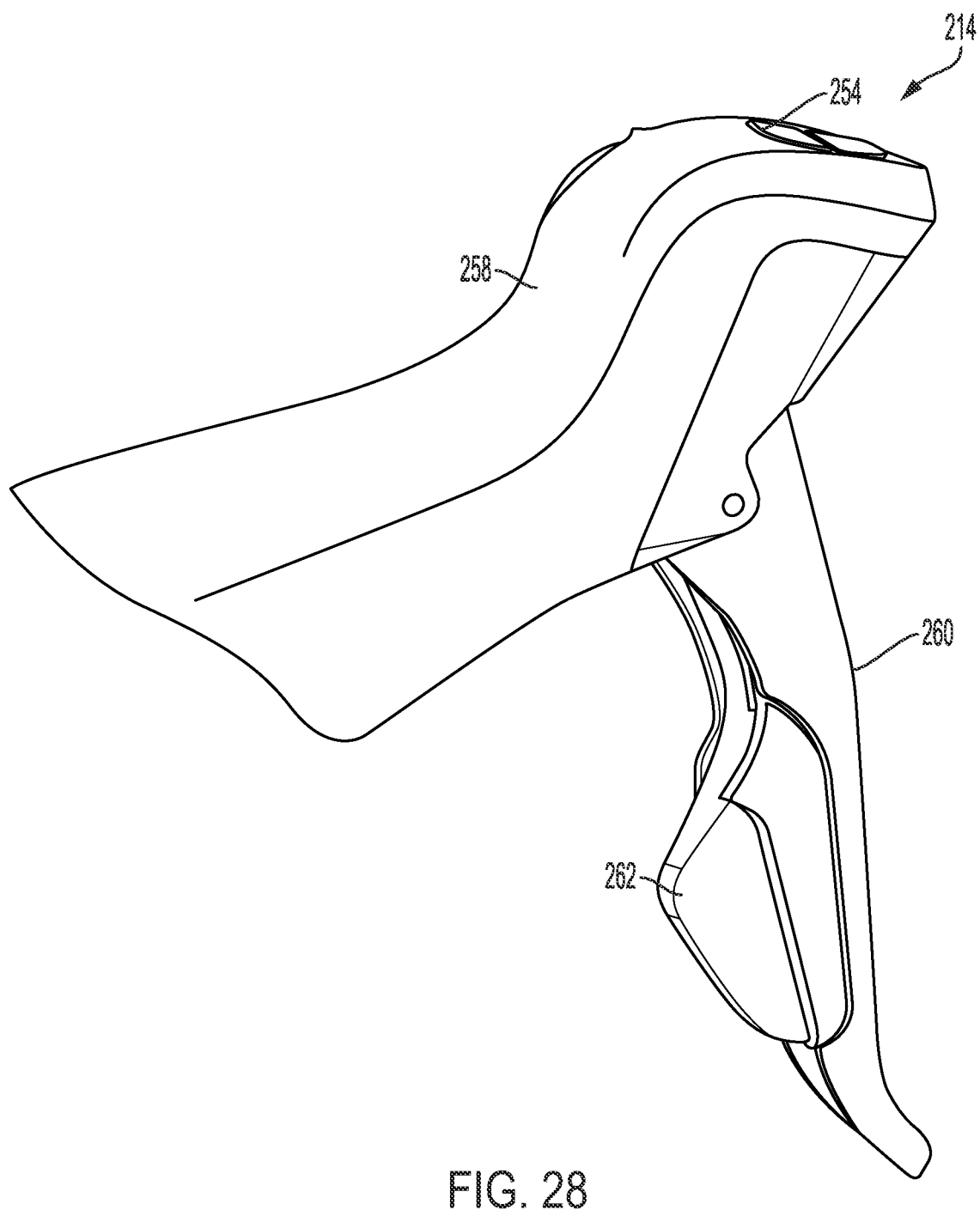
FIG. 28 is an isometric opposing side view of the shifter/brake controller of a stationary bicycle training device in accordance with one embodiment.
Figure 29:
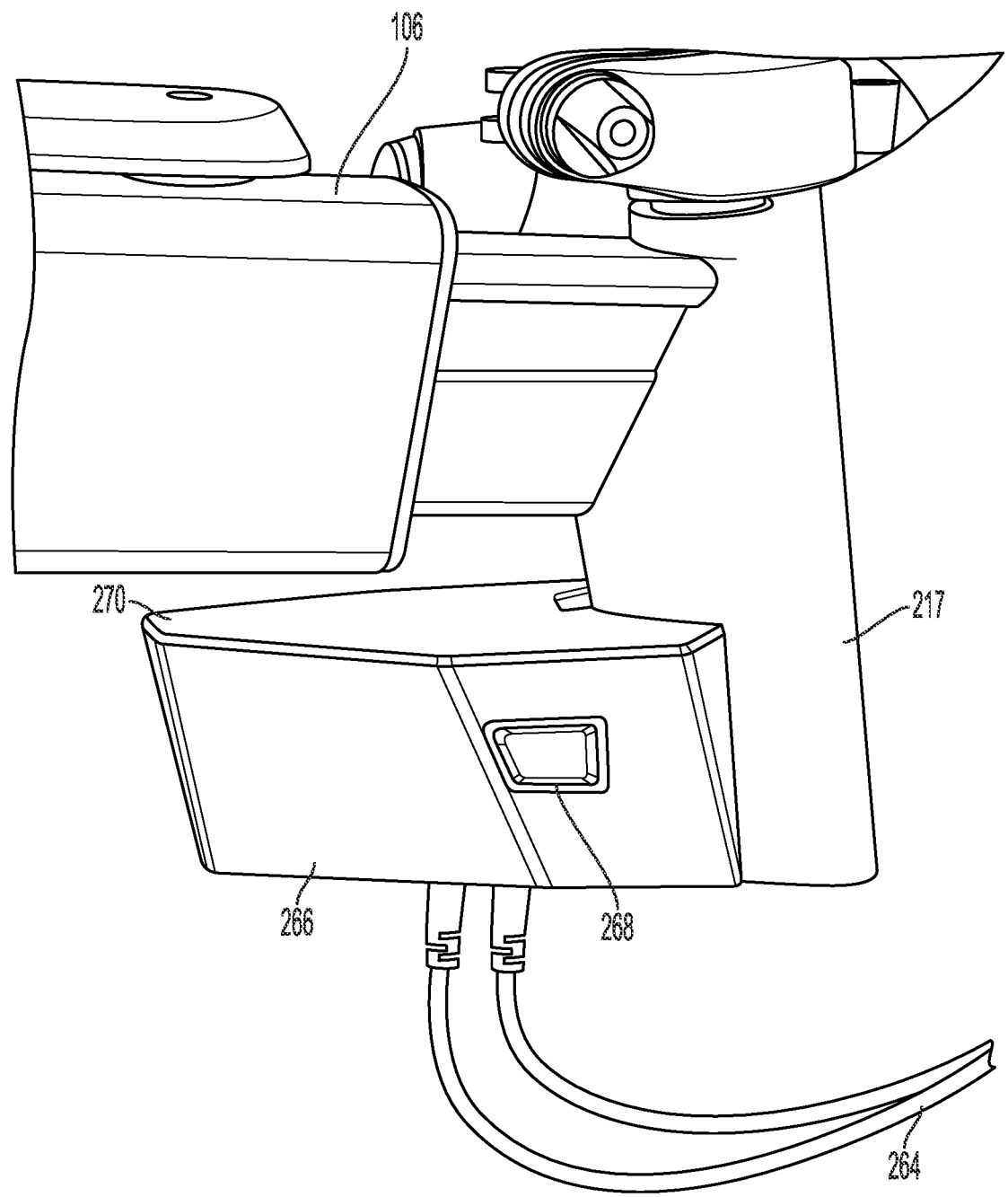
FIG. 29 is an isometric side view of a computing device of a stationary bicycle training device configured to receive inputs from the shifter/brake controller in accordance with one embodiment.

Turning now to FIGS. 26-28, the stationary bicycle 100 may include a handlebar assembly 202 with handlebars 212 and brake and shifter controllers 214 connected to a handlebar post which may be inserted into a head tube 217 as described above. In general, the handlebars 212 provide portions of the indoor bicycle 100 to which the rider may grab during use of the bicycle. The handlebars 212 may take any shape and, in one instance, may include a portion extending laterally from the handlebar post. Additional handlebars 212 may also include an arcuate member 252 extending down and rearward from the end the lateral handlebars 250. In some instances, the handlebars 212 may approximate a similar shape and design of commercially available outdoor bicycles such that a rider of the stationary bicycle 100 may approximate the experience of riding the outdoor bicycle.

One or more shifter/brake controllers 214 may extend from a forward end of the lateral handlebar portions 250 of the handlebars 212. The shifter/brake controllers 214 may also be of a form that approximates commercially available shifter/brake assemblies of outdoor or road bicycles. The shifter/brake controllers 214 may include a shifter controller portion 258 extending forward from the handlebars 212 and a brake controller portion 260 extending substantially vertically downward from the shifter controller portion 258. In some instances, referring now to FIGS. 27-28, the shifter/brake controller 214 may include several activators or buttons that a rider of the stationary bicycle 100 may use to control the operation of the bicycle. For example, a pair of shifter top control buttons 254 may be located on a top surface of the shifter/brake controllers 214 arranged in some configuration. An inner shifter button 256 may be located on an inner surface (or the surface of the shifter/brake controller 214 that faces toward a center line of the stationary bicycle 100). The shifter top control buttons 254 and/or the inner shifter button 256 may be activated by pressing the button with a rider's finger, palm, or other portion of the rider's hands. The brake controller portion 260 may be configured to pivot about an axis at the connection of the brake portion to the shifter controller portion 258 such that the rider may rotate the brake portion 260 toward the shifter controller portion 258. In addition, one or more lateral activators 262 may be located on the brake controller portion 260 and configured to rotate inward when pressed by the rider. A position sensor may also be associated with the lateral activators 262 to determine activation of the lateral activators by a rider of the stationary bicycle.

The various activators of the shifter/brake controllers 214 may be provide input signals to the control circuit 132 of the stationary bicycle 100. For example, pivoting of the brake controllers 260 may generate a signal to the control circuit 132 to apply a braking force on the flywheel/motor 126. In some instances, the degree of pivot or movement of the brake controller 260 may generate a higher braking force on the flywheel/motor assembly 126. In addition, activation of one or more the buttons (such as the top control buttons 254, the inner shifter button 256, and/or the lateral activators 262) may generate a control signal to the motor/flywheel assembly 126 to simulate a change in gear ratio of the stationary bicycle 100. For example, activation of one of the right lateral activators 262 may command the control circuit 132 to simulate a higher gear ratio and activation of one of the left lateral activators 262 may command the control circuit 132 to simulate a lower gear ratio. Altering simulated gear ratios of the stationary bicycle 100 is described in more detail below.

Figure 24:
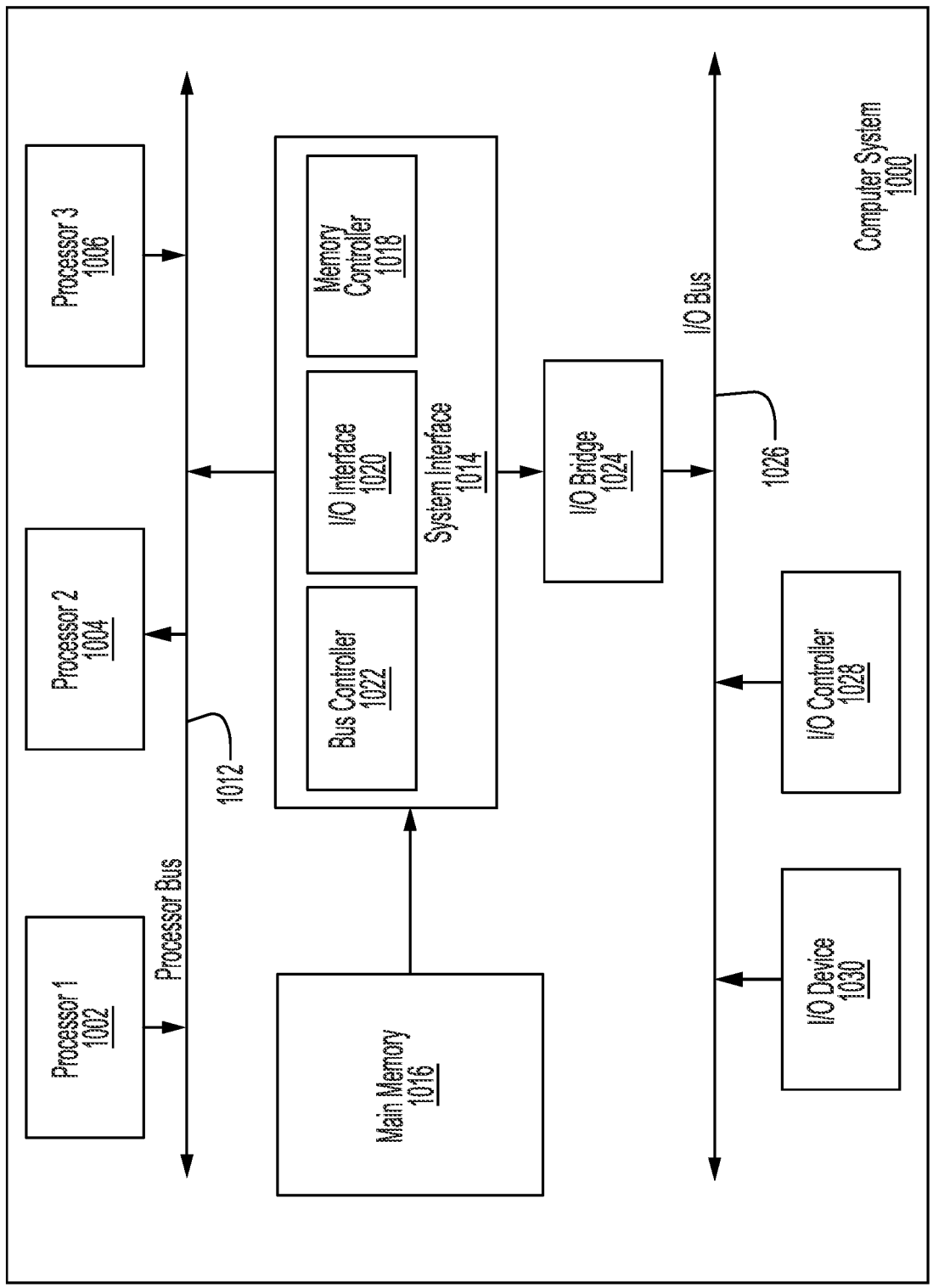
FIG. 24 is a diagram illustrating an example of a computing system which may be used in implementing embodiments of the present disclosure.

To provide the inputs from the rider via the activators of the shifter/brake controllers 214, one or more control wires 264 may connect the various activators and/or sensors to a top tube computing device 266. In some instances, the activators may communicate with the top tube computing device 266 via a wireless communication connection. In still other instances, the activators may communicate with the control circuit 132 of the stationary bicycle 100 via a wireless communication connection. The top tube computing device 266 may connect to a lower portion of the head tube 217 and extend under the forward horizontally adjustable arm 200. The top tube computing device 266 may include one or more components of a computing device described above with relation to FIG. 24 and may be in communication with the control circuit 132 via a wired or wireless connection. Inputs received from the activators of the shifter/brake controllers 214 may be processed and/or transmitted to the control circuit 132 for use in controlling the flywheel/motor assembly 126.

In some instances, the activators of the shifter/brake controllers 214 may be programmed or otherwise configurable to customize the operation of the bicycle to one or more preferences of the rider. For example, a program or mobile application may communicate with the top tube computing device 266 (or other computing device of the stationary bicycle 100) to program one or more of the inputs from the activators. For example, the program may configured the indoor bicycle 100 to interpret activation of the top control buttons 254 to change or shift the virtual gear ratio of the indoor bicycle 100. In other examples, the top control buttons 254 may be configured to generate a braking force on the flywheel member 234, to change an operational mode of the stationary bicycle 100, to tilt the bicycle forward or back, and the like. In general, any operation of the stationary bicycle 100 may be controlled through the activators of the shifter/brake controllers 214 as the control circuit 132 and/or the top tube computing device 266 may be configured to interpret inputs from the activators in different manners.

The top tube computing device 266 may include an additional activator 268 that may similarly be configured according to a program or application, such as to alter the operational mode or to change the tilt of the indoor bicycle 100. In some instances, a display may be included on or incorporated with a top surface of 270 the top tube computing device 266. The display on the top surface 270 of the top tube computing device 266 may provide various types of information to a rider of the stationary bicycle 100, such as the operational mode of the indoor bicycle 100, rider statistics, displays of the inputs received, information or data received from a companion program or application, and the like.

As described, the control circuit 132 may, upon receiving an input to alter or shift the virtual gear ratio of the stationary bicycle 100 may generate one or more motor control signals to alter or otherwise change the rotation of the flywheel member 234 according to the new virtual gear ratio. In addition to other inputs to the control algorithm (such as the estimated speed of a virtual avatar of the rider, the estimated torque of the rider, estimated characteristics of the rider's virtual bicycle, and other inputs either received or calculated as described above), the control circuit 132 may determine the virtual gear ratio selected by the rider through the activators of the shifter/brake controllers 214. With this information determined, one or more control signals for the motor may be generated by the control circuit 132 to simulate a riding experience, including the selected virtual gear ratio. In some instances, shifting virtual gear ratios may include determining a target cadence of the rider based on such estimations as a simulated linear speed of the rider (which may correspond to a rider avatar in a simulation program), a virtual or simulated drive ratio, a virtual or simulated gear ratio, a simulated back wheel circumference, and the like. The actual gear ratio of the stationary bicycle 100 may be known by the control circuit 132, such as a 4:1 gear ratio between the drive sprocket 116 and the rear gear 124. As such, the flywheel member 234 may spin at four times the rpms of the drive sprocket 116 or cadence of the rider. With this information and the calculated target cadence of the rider, the control circuit 132 may determine a targeted rotation speed of the flywheel member 234 and control the motor accordingly. In this manner, the control of the motor may be based on a selected virtual gear ratio indicated by the activators of the shifter/brake controllers 214.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various embodiments of the disclosure are discussed in detail above. While specific implementations are discussed, it should be understood that this is done for illustration purposes only. A person skilled in the relevant art will recognize that other components and configurations may be used without parting from the spirit and scope of the disclosure. Thus, the preceding description and drawings are illustrative and are not to be construed as limiting. Numerous specific details are described to provide a thorough understanding of the disclosure. However, in certain instances, well-known or conventional details are not described in order to avoid obscuring the description.

References to one or an embodiment in the present disclosure can be references to the same embodiment or any embodiment; and, such references mean at least one of the embodiments. Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. To the extent some embodiments herein are referred to as indoor cycling or indoor training devices, the terms are meant to refer to a device that is not an outdoor bicycle that can be ridden and not meant to infer any other specific meaning or structural requirement. In some instances, the term "center" may be used to refer to some component, which is not meant to imply that the component is necessarily dimensionally or mathematically centered but is rather used generally to indicate a general location or relative location to other components. In some instances, a first side or second side is referenced, and it should be recognized that the first side is not the same side as the second side. In some instances, the terms left or right, or front or back (forward or rearward) are used, and in such cases it may be the case that the terms are used based on the perspective of a user on the indoor cycling bike facing the handlebars. So, for example, the user's left foot would be on the left pedal, right foot on the right pedal, and the handlebars are toward the front. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

We claim:

1. A stationary indoor cycling device comprising:
    a vertical post comprising an upper end and a lower end; and
    a support leg comprising:
        a front portion extending forwardly from the lower end of the vertical post to engage a surface directly forward of the vertical post;
        a first angled portion and a second angled portion each extending rearwardly and laterally from the lower end of the vertical post to engage the surface, each of the first angled portion and the second angled portion comprising a foot on a bottom surface of an end of the corresponding angled portion for contacting the surface rearwardly and laterally from the lower end of the vertical post;
        a first arcuate portion connecting the front portion to the first angled portion at a right side of the vertical post; and
        a second arcuate portion connecting the front portion to the second angled portion at a left side of the vertical post.

2. The stationary indoor cycling device of claim 1, wherein the front portion of the support leg comprises a first support structure and a second support structure both extending forwardly from the lower end of the vertical post.

3. The stationary indoor cycling device of claim 2, further comprising:
    a foot cap connecting the first support structure and the second support structure at an end of the front portion opposite the post.

4. The stationary indoor cycling device of claim 3, wherein the foot cap engages the surface forward of the post.

5. The stationary indoor cycling device of claim 2, wherein the first support structure and the second support structure are substantially parallel.

6. The stationary indoor cycling device of claim 1, a foot assembly positioned at the lower end of the vertical post, the vertical post attached to and extending from the foot assembly, wherein the foot assembly engages the surface.

7. The stationary indoor cycling device of claim 6, wherein the first angled portion and the second angled portion each extend vertically from a top surface of the foot assembly towards the surface.

8. The stationary indoor cycling device of claim 6, wherein the foot assembly, the front portion, the first angled portion, and the second angled provide four points of support to the stationary indoor cycling device on the surface.

9. The stationary indoor cycling device of claim 1, further comprising:
    a top tube extending forwardly from the upper end of the post comprising:
        a seat assembly extending from a rearward end of top tube; and
        a handlebar assembly extending from a forward end of the top tube.

10. The stationary indoor cycling device of claim 9, wherein the seat assembly comprises a rearward adjustable arm, an upright seat post, and a seat, the seat assembly coupled with the rearward end of the top tube to adjustably extend the seat assembly forwardly or rearwardly relative to the rearward end of the top tube.

11. The stationary indoor cycling device of claim 9, wherein the handlebar assembly comprises a forward adjustable arm, an upright handlebar post, and a handlebar, the handlebar assembly coupled with the forward end of the top tube to adjustably extend the handlebar assembly forwardly or rearwardly relative to the forward end of the top tube.

12. The stationary indoor cycling device of claim 1, wherein the first angled portion extends laterally in a first lateral direction from the lower end of the vertical post and the second angled portion extends laterally in a second lateral direction from the lower end of the vertical post, the second lateral direction different than the first lateral direction.

13. The stationary indoor cycling device of claim 1, wherein the front portion of the support leg comprises a single support structure extending forwardly from the lower end of the vertical post.

14. The stationary indoor cycling device of claim 1, wherein the front portion, the first angled portion, and the second angled portion provide three points of support to the stationary indoor cycling device on the surface.

15. The stationary indoor cycling device of claim 1, further comprising:
    a crank axle extending through the post; and
    a crank arm connecting a pedal to a first end of the crank axle, the pedal threadably connected to the crank arm in one of a plurality of threaded pedal holes disposed in an arcuate arrangement along an end of the crank arm, wherein engagement of the pedal with the one of a plurality of threaded pedal holes defines a crank length.

16. A method of supporting an exercise bicycle comprising:
 providing a seat supported by a post;
 providing a front supporting leg extending substantially forwardly from the post and engaging a surface to provide forward support for the exercise bicycle;
 providing a first rear supporting leg oriented below and to the left of the seat, the first rear supporting leg extending substantially rearwardly and laterally from the post in a first direction and engaging the surface to provide a first rearward support for the exercise bicycle; and
 providing a second rear supporting leg oriented below and to the right of the seat, the second rear supporting leg extending substantially rearwardly and laterally from the post in a second direction and engaging the surface to provide a second rearward support for the exercise bicycle, wherein the front supporting leg, the first rear supporting leg, and the second rear supporting leg provide three points of support to the exercise bicycle on the surface.

17. The method of claim 16, further comprising wherein the front supporting leg comprises a single support structure extending forwardly from the post to engage the surface.

18. The method of claim 16, wherein the front supporting leg comprises a first support structure and a second support structure both extending forwardly from the post to engage the surface.

19. The method of claim 16, wherein the front supporting leg comprises a foot cap at an end of the front supporting leg opposite the post, the foot cap engaging the surface.

* * * * *

UNITED STATES PATENT AND TRADEMARK OFFICE
CERTIFICATE OF CORRECTION

PATENT NO. : 12,465,811 B2  
APPLICATION NO. : 18/110815  
DATED : November 11, 2025  
INVENTOR(S) : Harold M. Hawkins, III and Michael Carlson Page 1 of 1

It is certified that error appears in the above-identified patent and that said Letters Patent is hereby corrected as shown below:

In the Claims

In Claim 3, Column 30, Line 7, 'the post' should be corrected to -- the vertical post --;
In Claim 9, Column 30, Line 29, 'the post' should be corrected to -- the vertical post --; and
In Claim 15, Column 30, Line 64, 'the post' should be corrected to -- the vertical post --.

Signed and Sealed this
Twenty-third Day of December, 2025

John A. Squires
*Director of the United States Patent and Trademark Office*